(12) United States Patent
Wolfe et al.

(10) Patent No.: US 11,094,008 B2
(45) Date of Patent: Aug. 17, 2021

(54) DEBT RESOLUTION PLANNING PLATFORM FOR ACCELERATING CHARGE OFF

(71) Applicant: Capital One Services, LLC, McLean, VA (US)

(72) Inventors: Jeffrey Wolfe, Richmond, VA (US); Sushant Likhate, Glen Allen, VA (US); Jonathan Lipkin, Vienna, VA (US); Megan Edds, Glen Allen, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 16/119,046

(22) Filed: Aug. 31, 2018

(65) Prior Publication Data
US 2020/0074540 A1 Mar. 5, 2020

(51) Int. Cl.
*G06Q 40/02* (2012.01)

(52) U.S. Cl.
CPC .................. *G06Q 40/025* (2013.01)

(58) Field of Classification Search
CPC ... G06Q 40/02; G06Q 40/025; G06Q 30/0215
USPC ....................................... 705/35–45
See application file for complete search history.

(56) References Cited

U.S. PATENT DOCUMENTS

| | | | | |
|---|---|---|---|---|
| 4,774,664 A * | 9/1988 | Campbell | ............. | G06Q 20/40 700/90 |
| 6,098,052 A * | 8/2000 | Kosiba | .................. | G06Q 10/10 235/379 |
| 6,556,979 B1 * | 4/2003 | Liu | ..................... | G06Q 20/403 705/38 |
| 7,191,150 B1 * | 3/2007 | Shao | ................ | G06Q 10/06312 705/38 |
| 7,383,215 B1 * | 6/2008 | Navarro | ................. | G06Q 30/02 705/30 |

(Continued)

OTHER PUBLICATIONS

William, Atkinson, "Boosting your collections", Credit Union Executive Journal, Jan./Feb. 1999, vol. 39, issue 1, pp. 1-5 (Year: 1999).*

(Continued)

*Primary Examiner* — Mohammad Z Shaikh
(74) *Attorney, Agent, or Firm* — Harrity & Harrity, LLP

(57) ABSTRACT

A device receives a request for information regarding a debt resolution plan available for a delinquent account. The request may include a first input indicating a payment amount, a second input indicating a payment frequency, and a third input indicating a payment start date. The device obtains account data associated with the delinquent account and determines, using a model, a score for the delinquent account based on the first input, the second input, the third input, and/or the account data. The score predicts a likelihood that the delinquent account will charge off within a predetermined time period. The device determines a plurality of plan parameters for an accelerated charge off plan when the score satisfies a threshold. The device transmits the plurality of plan parameters, receives an enrollment request, enrolls the delinquent account in the accelerated charge off plan, and performs one or more actions based on the enrolling.

20 Claims, 17 Drawing Sheets

(56) References Cited

U.S. PATENT DOCUMENTS

| | | | | |
|---|---|---|---|---|
| 7,401,050 B2* | 7/2008 | O'Neill | | G06Q 20/10 |
| | | | | 705/35 |
| 7,403,923 B2* | 7/2008 | Elliott | | G06Q 20/10 |
| | | | | 705/38 |
| 7,403,931 B2* | 7/2008 | Tayebnejad | | G06Q 40/08 |
| | | | | 706/14 |
| 7,536,348 B2* | 5/2009 | Shao | | G06Q 10/06312 |
| | | | | 705/38 |
| 7,546,262 B1* | 6/2009 | Ferguson | | G06Q 40/00 |
| | | | | 705/35 |
| 7,559,217 B2* | 7/2009 | Bass | | G06Q 30/04 |
| | | | | 235/379 |
| 7,580,890 B2* | 8/2009 | Siegel | | G06Q 20/10 |
| | | | | 705/39 |
| 7,617,156 B1* | 11/2009 | Wolfson | | G06Q 20/10 |
| | | | | 705/42 |
| 7,827,100 B2* | 11/2010 | Singh | | G06Q 40/02 |
| | | | | 705/38 |
| 8,396,789 B1* | 3/2013 | Sudjianto | | G06Q 40/025 |
| | | | | 705/38 |
| 8,660,941 B2* | 2/2014 | Willey | | G06Q 20/102 |
| | | | | 705/38 |
| 9,536,263 B1* | 1/2017 | Dean | | G06Q 40/02 |
| 2002/0116245 A1* | 8/2002 | Hinkle | | G06Q 40/12 |
| | | | | 705/40 |
| 2003/0033245 A1* | 2/2003 | Kahr | | G06Q 20/10 |
| | | | | 705/39 |
| 2003/0050795 A1* | 3/2003 | Baldwin, Jr. | | G06Q 40/02 |
| | | | | 705/2 |
| 2003/0225642 A1* | 12/2003 | Baker | | G06Q 20/10 |
| | | | | 705/35 |
| 2004/0015425 A1* | 1/2004 | O'Neill | | G06Q 40/025 |
| | | | | 705/35 |
| 2004/0030667 A1* | 2/2004 | Xu | | G06Q 40/08 |
| 2004/0044604 A1* | 3/2004 | O'Neil | | G06Q 40/02 |
| | | | | 705/35 |
| 2004/0073504 A1 | 4/2004 | Bryman et al. | | |
| 2005/0080821 A1* | 4/2005 | Breil | | G06Q 40/02 |
| 2005/0102228 A1 | 5/2005 | Srinivasan et al. | | |
| 2006/0059073 A1* | 3/2006 | Walzak | | G06Q 40/025 |
| | | | | 705/35 |
| 2006/0212386 A1* | 9/2006 | Willey | | G06Q 40/02 |
| | | | | 705/38 |
| 2007/0043659 A1* | 2/2007 | Kass | | G06Q 30/02 |
| | | | | 705/38 |
| 2007/0043660 A1* | 2/2007 | Kass | | G06Q 40/02 |
| | | | | 705/38 |
| 2007/0094137 A1* | 4/2007 | Phillips | | G06Q 20/102 |
| | | | | 705/40 |
| 2007/0156576 A1* | 7/2007 | Imrey | | G06Q 40/00 |
| | | | | 705/38 |
| 2007/0156581 A1* | 7/2007 | Imrey | | G06Q 20/02 |
| | | | | 705/39 |
| 2007/0203827 A1* | 8/2007 | Simpson | | G06Q 40/00 |
| | | | | 705/38 |
| 2007/0219885 A1* | 9/2007 | Banasiak | | G06Q 10/04 |
| | | | | 705/35 |
| 2007/0255645 A1* | 11/2007 | Morris | | G06Q 40/00 |
| | | | | 705/38 |
| 2009/0024881 A1* | 1/2009 | Carroll | | G06Q 40/06 |
| | | | | 714/57 |
| 2009/0048957 A1* | 2/2009 | Celano | | G06Q 40/00 |
| | | | | 705/35 |
| 2009/0063311 A1* | 3/2009 | Allison, Jr. | | G06Q 40/02 |
| | | | | 705/30 |
| 2009/0125439 A1* | 5/2009 | Zarikian | | G06Q 10/067 |
| | | | | 705/38 |
| 2010/0287093 A1* | 11/2010 | He | | G06Q 20/025 |
| | | | | 705/38 |
| 2011/0022513 A1* | 1/2011 | Singh | | G06Q 40/025 |
| | | | | 705/38 |
| 2011/0161155 A1* | 6/2011 | Wilhelm | | G06Q 30/0226 |
| | | | | 705/14.27 |
| 2011/0178859 A1* | 7/2011 | Imrey | | G06Q 20/405 |
| | | | | 705/14.25 |
| 2011/0178900 A1* | 7/2011 | Imrev | | G06Q 10/10 |
| | | | | 705/30 |
| 2012/0191624 A1* | 7/2012 | Ousley | | G06Q 40/06 |
| | | | | 705/342 |
| 2013/0151383 A1* | 6/2013 | Gancarz | | G06Q 40/02 |
| | | | | 705/30 |
| 2014/0019333 A1* | 1/2014 | Morris | | G06Q 40/025 |
| | | | | 705/38 |
| 2014/0222716 A1* | 8/2014 | Joplin | | G06Q 10/063 |
| | | | | 705/36 R |
| 2016/0125529 A1* | 5/2016 | Acharya | | G06Q 40/025 |
| | | | | 705/38 |
| 2017/0249697 A1* | 8/2017 | Agrawal | | G06Q 40/025 |
| 2019/0205977 A1* | 7/2019 | Way | | G06N 7/005 |

OTHER PUBLICATIONS

Stewart, R.T; "A profit based scoring system in consumer credit: making acquisition decisions for credit cards", The Journal of Operational Research Society, Abingdon, vol. 62 ,issue 9, pp. 1-8 (Year: 2011).*

Kou, Gang; Shi, Yong; Wise, Morgan,; Xu, Weixuan, "Discovering Credit Card Holder's Behavior by Multiple Criteria Linear Programming", Annals of Operation Research, vol. 135, pp. 261-274, 2005. (Year: 2005).*

* cited by examiner

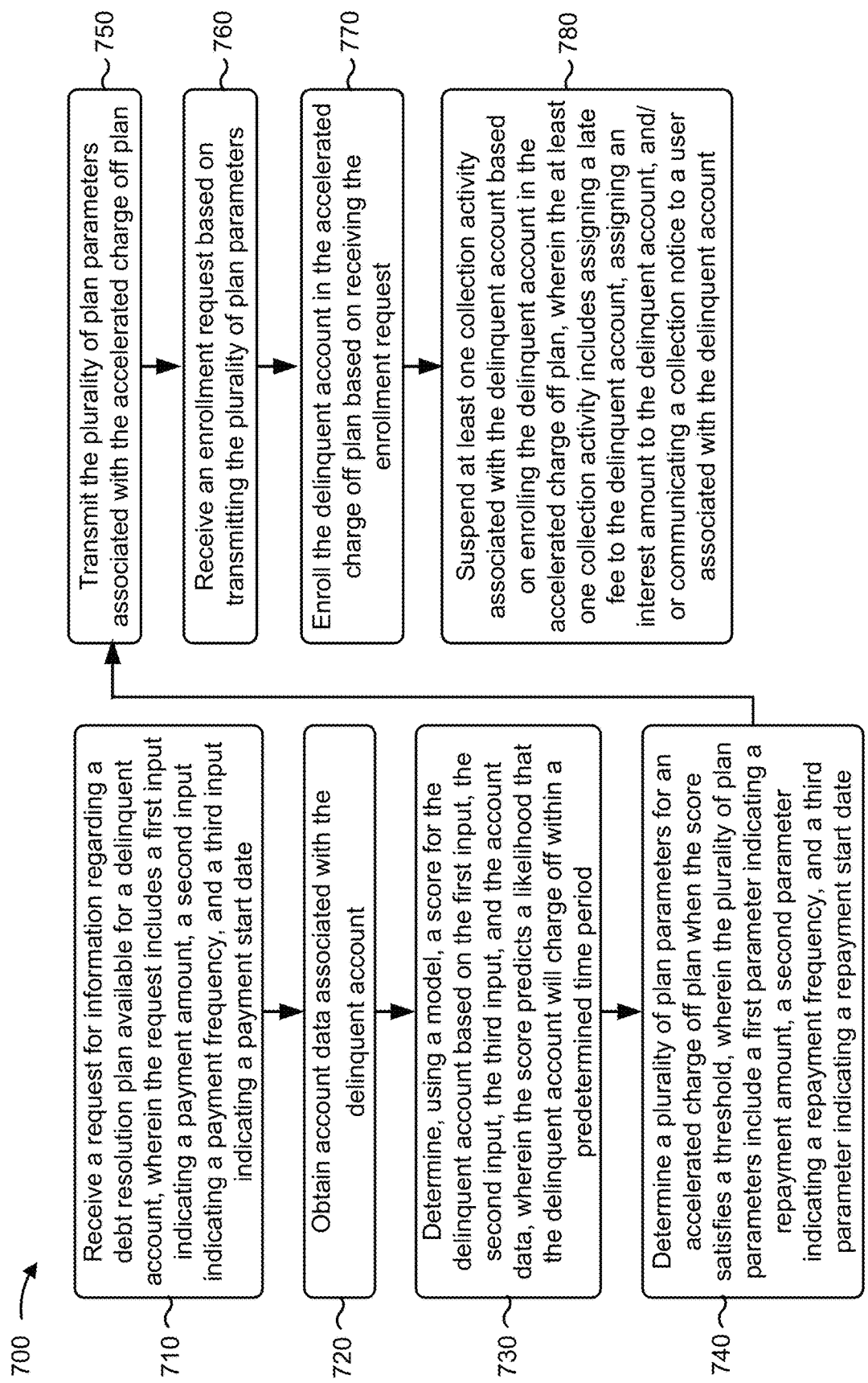

DEBT RESOLUTION PLANNING PLATFORM FOR ACCELERATING CHARGE OFF

BACKGROUND

A user may employ a third-party credit counseling firm to implement a debt management plan on the user's behalf. Implementing a debt management plan may entail generating a formal agreement between the user, the third-party credit counseling firm, and one or more creditors. During formation of the debt management plan, the third-party credit counseling firm and the one or more creditors may establish an arbitrary payment amount and set a payment schedule. The user may subsequently be presented with the payment amount and payment schedule, and agree to make payments to the third-party credit counseling firm. Upon enrollment of an account in a debt management plan, charging off, of the account, may be prohibited or delayed.

SUMMARY

According to some possible implementations, a method may include receiving a request for information regarding a debt resolution plan available for a delinquent account, wherein the request includes a first input indicating a payment amount, a second input indicating a payment frequency, and a third input indicating a payment start date. The method may include obtaining account data associated with the delinquent account, and determining, using a model, a score for the delinquent account based on the first input, the second input, the third input, and the account data. The score may predict a likelihood that the delinquent account will charge off within a predetermined time period. The method may include determining a plurality of plan parameters for an accelerated charge off plan when the score satisfies a threshold. The plan parameters may include at least a first parameter indicating a repayment amount, a second parameter indicating a repayment frequency, and a third parameter indicating a repayment start date. The method may further include transmitting the plurality of plan parameters associated with the accelerated charge off plan, receiving an enrollment request based on transmitting the plurality of plan parameters, and enrolling the delinquent account in the accelerated charge off plan based on receiving the enrollment request. The method may further include performing one or more actions based on enrolling the delinquent account in the accelerated charge off plan.

According to some possible implementations, a device may include one or more memories, and one or more processors, communicatively coupled to the one or more memories, to receive a request for information regarding a debt resolution plan available for a delinquent account, wherein the request includes a first input indicating a payment amount, a second input indicating a payment frequency, and a third input indicating a payment start date. The one or more processors may obtain account data associated with the delinquent account and determine, using a model, a score for the delinquent account based on the first input, the second input, the third input, and the account data. The score may predict a likelihood that the delinquent account will charge off within a predetermined time period. The one or more processors may determine a plurality of plan parameters for an accelerated charge off plan when the score satisfies a threshold, wherein the plan parameters may include at least a first parameter indicating a repayment amount, a second parameter indicating a repayment frequency, and a third parameter indicating a repayment start date. The one or more processors may transmit the plurality of plan parameters associated with the accelerated charge off plan, receive an enrollment request based on transmitting the plurality of plan parameters, and enroll the delinquent account in the accelerated charge off plan based on receiving the enrollment request. The one or more processors may assign the delinquent account a charge off code and selectively suspend a collection activity for the delinquent account, based on presence of the charge off code.

According to some possible implementations, a non-transitory computer-readable medium may store instructions including one or more instructions that, when executed by one or more processors of a device, cause the one or more processors to receive a request for information regarding a debt resolution plan available for a delinquent account, wherein the request includes a first input indicating a payment amount, a second input indicating a payment frequency, and a third input indicating a payment start date. The one or more instructions may further cause the one or more processors to obtain account data associated with the delinquent account, and determine, using a model, a score for the delinquent account based on the first input, the second input, the third input, and the account data. The score may predict a likelihood that the delinquent account will charge off within a predetermined time period. The one or more instructions may further cause the one or more processors determine a plurality of plan parameters for an accelerated charge off plan when the score satisfies a threshold, wherein the plan parameters include at least a first parameter indicating a repayment amount, a second parameter indicating a repayment frequency, and a third parameter indicating a repayment start date. The one or more instructions may further cause the one or more processors to transmit the plurality of plan parameters associated with the accelerated charge off plan, receive an enrollment request based on transmitting the plurality of plan parameters, and enroll the delinquent account in the accelerated charge off plan based on receiving the enrollment request. The one or more instructions may further cause the one or more processors to suspend at least one collection activity associated with the delinquent account based on enrolling the delinquent account in the accelerated charge off plan, wherein the at least one collection activity may include assigning a late fee to the delinquent account, assigning an interest amount to the delinquent account, and/or communicating a collection notice to a user associated with the delinquent account.

BRIEF DESCRIPTION OF THE DRAWINGS

FIG. 7 is a flow chart of an example process for accelerating an account charge off. .

DETAILED DESCRIPTION

Figure 1A:
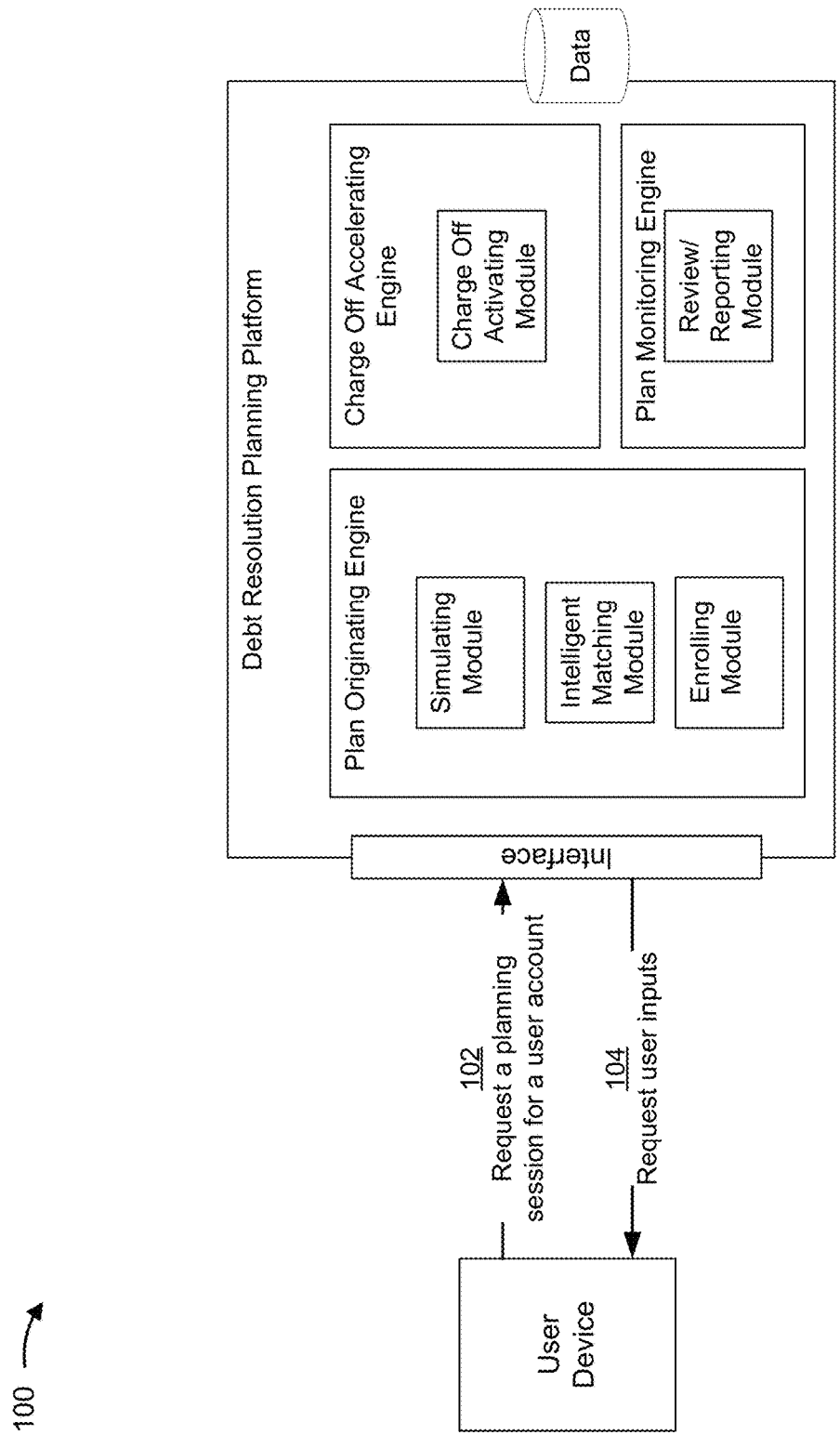
FIGS. 1A-1D are diagrams of an example implementation described herein.

The following detailed description of example implementations refers to the accompanying drawings. The same reference numbers in different drawings may identify the same or similar elements.

Third-party credit counseling firms act as intermediaries on behalf of users, and broker debt settlements and/or debt management plans with the users' creditors. Existing debt management plans include terms set by the third-party credit counseling firms and the creditors and, thus, lack insight, intelligence, and/or user input. Moreover, existing debt management plans lack efficiency in terms of planning, enrolling, and/or allocating payments. For example, a user must often endure an undue wait time and, thus, incur unnecessary fees, before enrolling in a debt management plan, to allow a third-party credit counseling firm time to negotiate a payment, an interest rate, and/or a payment schedule with a creditor. Further, payments to a creditor may be delayed, as a user must make the payments directly to a third-party credit counseling firm, and then wait on the third-party credit counseling firm to disburse payments to the creditor. In some cases, a debt may be so delinquent that a creditor may deem the debt uncollectible, and unexpectedly charge off the debt, which can wreak havoc on a user's credit score. Existing debt management plans fail to detect such cases, and a user may lose hope that the user's credit score will ever be restored and/or repaired. Existing practices associated with implementing existing debt management plans lend to inefficiencies, waste, fraud, and/or abuse in association with obtaining user information and/or allocating payments.

Some implementations described herein provide an interactive debt resolution planning platform, which obtains user inputs, obtains account data for a user account, predicts future behavior associated with a user account, and intelligently matches the user and/or the user account to an accelerated charge off plan when, for example, the user account is predicted to charge off in the future. Upon receiving an enrollment request from the user, by which the user may opt in to participating in the accelerated charge off plan, the debt resolution planning platform may automatically enroll the user account in the accelerated charge off plan, so that the user may begin making payments directly to a creditor. In this way, delays associated with employing a third-party credit counseling firm may be obviated. As consideration for a user enrolling in an accelerated charge off plan, the debt management planning platform may automatically perform one or more actions that positively impact the user, such as suspending late fees from being applied to the user's debt, suspending interest from being applied to the user's debt, and/or suspending collection communications (e.g., collection calls, letters, emails, and/or the like) associated with the user's debt. In this way, a user may gain peace of mind that a debt may be positively resolved. In this way, a debt may be proactively charged off, with the user's knowledge and/or consent, so that the user may begin proactively paying off the debt and, thus, accelerating the time to recover and/or repair the user's credit score.

In this way, several different stages of a process for implementing intelligent debt resolution planning and/or enrollment in an accelerated charge off plan may be automated, which may remove human subjectivity and waste from the process, and which may improve speed and efficiency of the process and conserve computing resources (e.g., processor resources, memory resources, and/or the like). Furthermore, implementations described herein employ a rigorous, computerized process to perform tasks or roles that were not previously performed or were previously performed using subjective human intuition or input. For example, currently there does not exist a technique for facilitating intelligent debt resolution planning by which a user account may be proactively charged off. Finally, automating the process for implementing intelligent debt resolution planning conserves computing resources (e.g., processor resources, memory resources, and/or the like) that would otherwise be wasted in attempting to negotiate and enroll a user in a debt management plan that may ultimately fail, due to a lack of intelligence, insight, and/or the like.

In this way, computing resources associated with a creditor (e.g., a financial service provider, a lender, a bank, etc.) that would otherwise be wasted in determining fees, determining interest, generating and/or sending out collection communications, and/or the like, may be minimized and/or conserved. Further, postal resources (e.g., vehicle fuel, vehicle parts, equipment resources that process mail, and/or the like) that would otherwise be wasted in processing, mailing, and/or shipping collection communications, late or delinquent notices, and/or the like, may be minimized and/or conserved. Further, computing and/or network resources associated with a user device, that would otherwise be wasted in receiving and/or processing collection communications (e.g., collection e-mails, collection text messages, and/or the like) may be minimized and/or conserved. Finally, enrolling in an accelerated charge off plan generated by the debt resolution planning platform may improve a user's experience and/or sentiment, by placing the user more in control of the user's credit, and allowing the user to overcome what may feel like an otherwise hopeless situation.

FIGS. 1A-1D are diagrams of an example implementation 100 described herein. As shown in FIGS. 1A-1D, example implementation 100 may include a debt resolution planning platform that interacts with one or more user devices. In some implementations, the debt resolution planning platform may include a plan originating engine, which may employ a simulating module and one or more models (e.g., algorithms, machine learning models, and/or the like) for simulating future activity and/or behavior associated with a user's account, and an intelligent matching module and one or more models for applying intelligence and insight in determining debt resolution plans (e.g., accelerated charge off plans, and/or the like) and/or plan parameters that best match the user's account. The plan originating engine of the debt resolution planning platform may additionally include an enrolling module for automating enrollment of the user's account in an accelerated charge off plan, where, for example, the simulating module predicts that the user's account will charge off in the future and where the user requests enrollment in the accelerated charge off plan. Upon enrollment of the user account in the accelerated charge off plan, the debt resolution planning platform may perform various actions and/or cause various actions to be performed, automatically, that may suspend one or more collection activities associated with the user's account. The debt management platform may additionally include a charge off accelerating engine, configured to employ a charge off activating module, by which a user account may be proactively charged off in a creditor's system of record. The debt resolution planning platform may additionally, or alternatively, include a plan monitoring engine including a review and/or reporting module, by which a user's compliance with an accelerated charge off plan may be reviewed, monitored, and/or reported.

In some implementations, the debt resolution planning platform may include an intelligent digital planning tool, accessible to users (e.g., debtors, customers, account holders, and/or the like) having an account with a creditor (e.g., a business, a financial account provider, and/or the like), which the users may electronically access (e.g., by way of a wired network connection, a wireless network connection, and/or the like) to initiate an interactive debt resolution planning session. During the interactive debt resolution planning session, the debt resolution planning platform may obtain information from a user, by way of a user device, regarding the user's ability to pay a debt associated with an account, obtain information regarding the user's account, and execute one or more models for simulating account behavior. Where the debt resolution planning platform determines that an account may charge off in the future, the debt resolution planning platform may generate and present an accelerated charge off plan, including customized plan parameters, to the user, by which the user may request enrollment to begin paying down a debt, as described herein. In this way, users that may otherwise feel hopeless or overwhelmed by a debt may experience improved customer sentiment, loyalty, and/or peace of mind that the debt may be repaid, without having to incur prolonged damage to the user's credit.

As shown in FIG. 1A, and by reference number 102, a user may request a planning session with the debt resolution planning platform by way of a user device, whereby the user may request generation of a debt resolution plan for a user account (e.g., a loan account, a credit card account, and/or the like). In some implementations, the user account may include a delinquent account (e.g., as identified by a delinquent status) associated with a debt, for which the user may have missed one or more payments, made one or more deficient payments, and/or the like. The user device may include, for example, a computer (e.g., a laptop computer, a desktop computer, and/or the like), a tablet, a smart phone, a wearable computer (e.g., a smart watch, and/or the like), and/or the like.

In some implementations, the user device may communicate, to the debt resolution planning platform, a request to initiate (e.g., establish, create, build, and/or the like) a debt resolution plan for the user account during the planning session. The request may include an account identifier (e.g., an account number, a credit card number, a user identifier, and/or the) associated with the user account for which the debt resolution plan may be determined and/or implemented. In some implementations, the user may access and/or communicate with the debt resolution planning platform by way of a web-based portal or interface, a mobile application, and/or the like. In some implementations, the user device may communicate and/or interact with the debt resolution planning platform by way of a user interface, which may be configured to display information to the user, prompt the user to enter user inputs, and/or the like.

As further shown in FIG. 1A, and by reference number 104, the debt resolution planning platform may request the user to provide one or more user inputs in response to receiving the request to initiate a planning session for the user account. In some implementations, the debt resolution planning platform may prompt the user to provide the one or more user inputs by way of one or more digitally interactive features or elements displayed by a user interface of the user device. For example, the debt resolution planning platform may transmit an interactive pop-up message, to the user device, that includes one or more dropdown boxes by which the user may select an input. As another example, the debt resolution planning platform may provide an interactive calendar, by which the user may select an input. As another example, the debt resolution planning platform may provide an editable field, by which the user may input text, photos, touchscreen input, and/or the like. In some implementations, the user inputs may provide intelligence or insight, by which the debt resolution planning platform may predict future behavior or activity for the user account and/or determine one or more plan parameters customized for the user account.

Figure 1B:
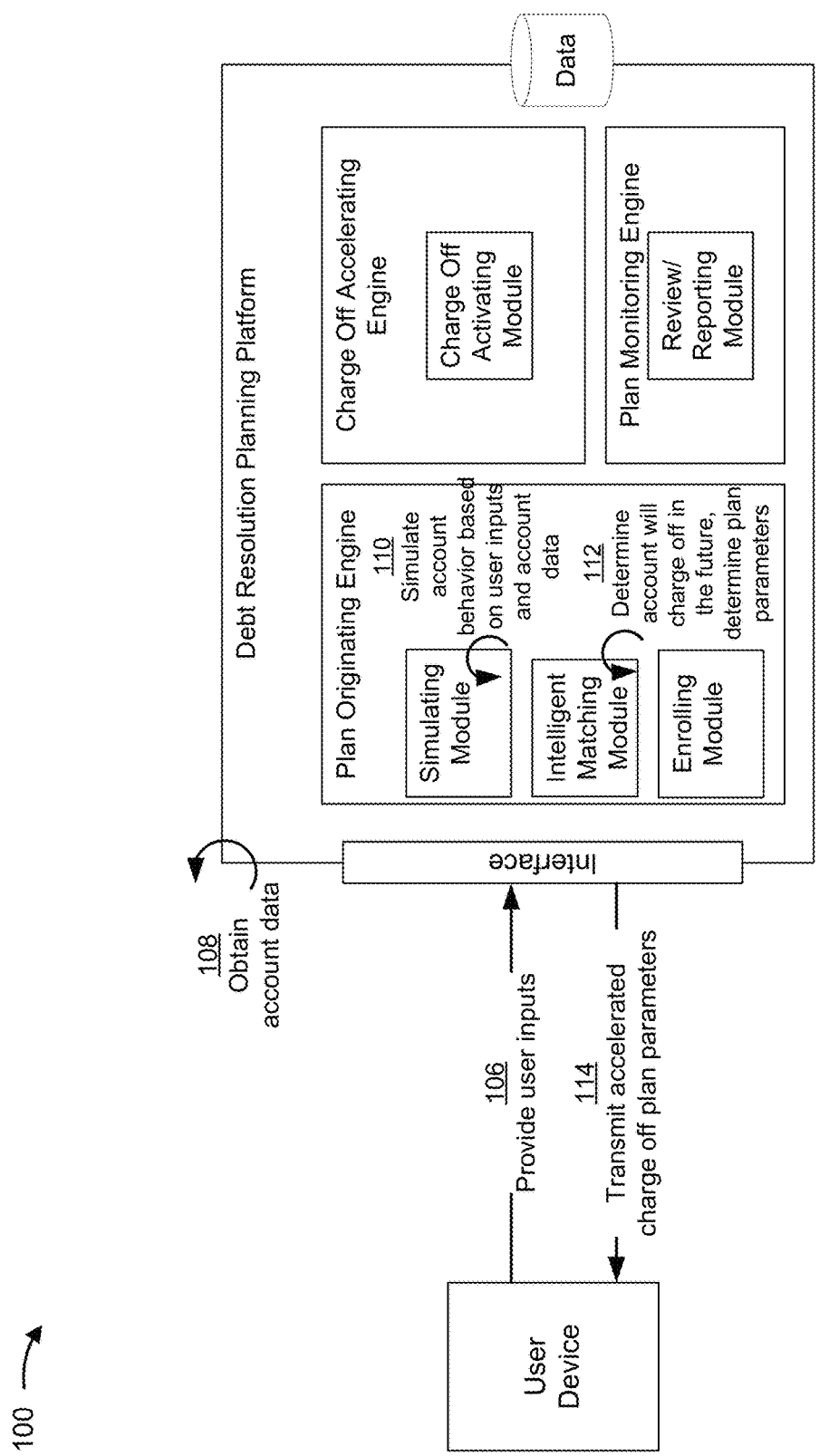

Turning now to FIG. 1B, and by reference number 106, one or more user inputs may be communicated to the debt resolution planning platform by way of the user device. Such user inputs may be used, for example, as data, input, and/or factors in determining one or more debt resolution plans and/or plan parameters, as described herein. Such user inputs may be input by way of a user interface disposed on the user device. In some implementations, the debt resolution planning platform may prompt the user to enter the one or more user inputs, as described above. For example, the debt resolution planning platform may prompt the user to provide at least first input, indicating a payment amount that the user may be able to make in repaying a debt associated with the user account, a second input indicating a payment frequency (e.g., monthly, weekly, and/or the like) at which the user may make the payment amount, and a third input indicating a payment start date. In this way, the debt resolution planning platform may obtain the user inputs in a digital form and utilize such user inputs to intelligently determine one or more debt resolution plans and/or plan parameters to present to the user, by which the user may optionally enroll the user account.

As further shown in FIG. 1B, and by reference number 108, the debt resolution planning platform may obtain account data associated with the user account for which the debt resolution planning session is requested. In some implementations, the debt resolution planning platform may access the account data for use in simulating future activity and/or behavior associated with the user account to determine, for example, a likelihood of the user account charging off in the future. As an example, the account data obtained by the debt resolution planning platform may include a current interest rate for a user account, a current amount of fees associated with the user account, a current minimum payment associated with the user account, information relating to a number of months to pay off a debt associated with the user account, information relating to past payments associated with the user account, and/or the like.

Additionally, or alternatively, in some implementations, the account data obtained by the debt resolution planning platform may include a current balance for the user account, current and/or previous minimum payments for the user account, current and/or previous past due amounts for the user account, current, past, and/or upcoming cycle dates for the user account, upcoming due dates for payments associated with the user account, interest rates and/or interest rate terms for the user account, fees and/or fee terms for the user account, charge off terms for the user account, historical information indicating fees charged for the user account, historical information indicating payments associated with the user account, historical re-age information associated with the user account, and/or the like. Such data may be used to simulate future behavior of the user account for determining whether an accelerated charge off plan may be suitable for the user account.

In some implementations, the debt resolution planning platform may obtain the account data from a data structure (e.g., a local or remote data structure), a system of record, and/or the like, accessible to the debt resolution planning platform. The account data may be obtained by way of a streaming service or interface, a subscription service, a batch monitoring service, an application programming interface (API), and/or the like. As a specific example, the debt resolution planning platform may obtain account data, including a current interest rate associated with a user account, a current account balance associated with the user account, and a date of a last payment associated with the user account, by way of transmitting an API call to a service of record entity, and requesting the account data from the system of record entity (e.g., a system of record data structure).

As further shown in FIG. 1B, and by reference number 110, the debt resolution planning platform may simulate account activity and/or behavior based on the user inputs (i.e., obtained at 106) and/or the account data (i.e., obtained at 108) obtained by the debt resolution planning platform. In some implementations, the simulation may predict a likelihood of the user account charging off, or not charging off, within a predetermined time period. In some implementations, the prediction may be based on one or more scores (e.g., one or more predictive charge off scores) determined during simulation of the user account behavior or activity. The simulations performed by the debt resolution planning platform may predict the likelihood of a user account charging off during a time period of about 60 months or less, about 48 months or less, about 36 months or less, about 24 months or less, or less than about 12 months. In some implementations, the debt resolution planning platform may generate one or more debt resolution plans and/or plan parameters, based on a result of simulating the user account behavior, as described herein. For example, the debt resolution planning platform may generate an accelerated charge off plan and/or plan parameters associated with the accelerated charge off plan based on a result of comparing the one or more scores, determined using a model, to a threshold.

In some implementations, the simulating module of the debt resolution planning platform may simulate the user account behavior using a model (e.g., a first model), such as an account simulating model or algorithm. The model may be used to determine one or more scores associated with the user account based, at least in part, on the first input, the second input, the third input, and/or the account data obtained by the debt resolution planning platform. Additional factors, inputs, and/or data may be included in the model, where desired, for simulating future account behavior associated with the user account.

In some implementations, the model may include a machine learning model configured to receive, as input, the first input (e.g., the payment amount), the second input (e.g., the payment frequency), the third input (e.g., the payment start date), and/or account data (e.g., an interest rate for the user account, fees for the user account, minimum payment information for the user account, and/or the like), and determine, as output, a predictive charge off score based on performing a multi-source domain adaptation of historical data contained in a data structure. The model may be configured to correlate the historical data (e.g., historical user inputs, historical account data, and/or the like) to various domains or categories (e.g., a first category for an account that may charge off, a second category for an account that may not charge off, and/or the like), and generate a plurality of scores for each domain or category. The predictive charge off score may include an aggregate or weighted score, obtained by aggregating or weighting the plurality of scores, determined by way of correlating the historical data to the various domains or categories. In this way, the model may intelligently simulate, or predict, future behavior for a user account based on historic account data and/or historic user inputs. In this way, the debt resolution planning platform may execute models leveraging artificial intelligence techniques, such as machine learning techniques, deep learning techniques, and/or the like, for determining the predictive charge off score based on thousands, millions, and/or the like, of data points, thereby increasing an accuracy and consistency of the models. In this way, the debt resolution planning platform may analyze thousands, millions, or billions of data records for machine learning and model generation—a data set that cannot be processed objectively by a human actor.

In some implementations, the model may determine one or more predictive charge off scores, for a user account, which may indicate or predict a likelihood of the user account charging off (i.e., becoming uncollectible, intolerably delinquent, and/or the like) within a predetermined amount of time. As an example, the predictive charge off score may include a value of between about 1 and 10, in which a lower predictive charge off score (e.g., 1 to 5, and/or the like) may indicate or predict a user account as not likely charging off within the predetermined amount of time, whereas a higher predictive charge off score (e.g., 6-10, and/or the like) may indicate or predict a user account as likely charging off within the predetermined amount of time. Where the predictive charge off score is lower (e.g., compared to a threshold), an accelerated charge off plan may not be offered or presented to a user, and the user may, in some cases, be offered an alternative debt resolution plan. Additionally, or alternatively, where the predictive charge off score is higher (e.g., compared to a threshold), an accelerated charge off plan may be generated, presented, and/or offered to the user. Upon enrollment of a user account in an accelerated charge off plan, the user account may be closed, automatically, and the user may establish a payment plan or schedule by which to pay off the debt and/or repair any damage to the user's credit score.

As an example, the model may receive, as input, user inputs including a specified payment amount (e.g., $20.00), a specified frequency of payments (e.g., 50 monthly payments), a specified payment start date, and account data, including payment history data (e.g., a number of late payments, and/or the like), and determine a predictive charge off score based on the inputs. In this case, for example, where the model receives inputs indicating a low payment amount (e.g., less than $100.00, less than $50.00, less than $20.00, and/or the like) and a large number of late payments (e.g., more than 1 late payment, more than 2 late payments, and/or the like) for a user account, the predictive charge off score may be high, indicating that the user account may likely charge off during the predetermined time period. In this case, enrollment in an accelerated charge off plan may be an intelligent course of action for the user account. In this way, the debt resolution planning platform may intelligently predict account behavior, determine whether to offer an accelerated charge off plan, and generate plan parameters for an accelerated charge off plan, based, at least in part, on the predictive charge off score.

In some implementations, a single predictive charge off score may be determined for a user account. Additionally, or alternatively, multiple predictive charge off scores may be determined for a user account. For example, multiple predictive charge off scores may be determined for multiple billing cycles associated with the user account. In this way, predictive charge off scores may be predicted over time, for multiple billing cycles. In this way, the accuracy of predicting account behavior may improve.

In some implementations, the debt resolution planning platform may perform a training operation when generating the model to determine the predictive charge off scores. For example, the debt resolution planning platform may obtain historical data stored in a data structure, and portion the data into a training set, a validation set, a test set, and/or the like. In some implementations, the debt resolution planning platform may train the model to determine predictive charge off scores based on the historical data using, for example, an unsupervised training procedure based on the training set of data. For example, the debt resolution planning platform may perform a dimensionality reduction to reduce the training set of data to a minimum feature set, thereby reducing an amount of processing required to train the model to determine the predictive charge off scores, and may apply a classification technique, to the minimum feature set. The debt resolution planning platform may generate trained models using the minimum feature set to generate models based on thousands, millions, and/or the like of historic user inputs and historical account data for determining the predictive charge off scores associated with thousands, millions, and/or the like of accounts, thereby increasing an accuracy and consistency of the models. In this way, the debt resolution planning platform may analyze thousands, millions, or billions of data records for machine learning and model generation—a data set that cannot be processed objectively by a human actor.

In some implementations, the debt resolution planning platform may use a logistic regression classification technique to determine a categorical outcome (e.g., that a user account may charge off, that a user account may not charge off, and/or the like) for training a model. Additionally, or alternatively, the debt resolution planning platform may use a naïve Bayesian classifier technique for training a model. In this case, the debt resolution planning platform may perform binary recursive partitioning to split the data of the minimum feature set into partitions and/or branches and use the partitions and/or branches to perform predictions (e.g., that a user account may or may not charge off). Based on using recursive partitioning, the debt resolution planning platform may reduce utilization of computing resources relative to manual, linear sorting and analysis of data points, thereby enabling use of thousands, millions, or billions of data points to train a model, which may result in a more accurate model than using fewer data points. Additionally, or alternatively, the debt resolution planning platform may use a support vector machine (SVM) classifier technique to generate a non-linear boundary between data points in the training set. In this case, the non-linear boundary may be used to classify test data (e.g., user inputs, account data, and/or the like) into a particular class (e.g., a class indicating that a user account may charge off, a class indicating that a user account may not charge off, and/or the like).

As an example, the debt resolution planning platform may use a supervised multilabel classification technique to train the model. For example, as a first step, the debt resolution planning platform may map the user inputs, the account data, and/or the like, to data ranges associated with a likelihood of a user account charging off. In this case, the user inputs, the account data, and/or the like, may be characterized as being associated with an account that may likely charge off during a predetermined time, or may not likely charge off during the predetermined time based on characteristics of the user inputs, the account data, and/or the like. As a second step, the debt resolution planning platform may determine classifier chains, whereby labels of target variables may be correlated (e.g., in this example, the labels may include the user inputs, the account data, and/or the like, and the correlation may refer to a common account status (e.g., likely to charge off or not likely to charge off)). In this case, the debt resolution planning platform may use an output of a first label as an input for a second label (as well as one or more input features, which may include account data relating to the user account), and may determine a likelihood that particular user input, a particular account data, and/or the like includes a set of characteristics, at least some of which are associated with a particular account status (e.g., likely to charge off, not likely to charge off), and some of which are not associated with the particular account status, based on a similarity to other user inputs, account data, and/or the like that include similar characteristics. In this way, the debt resolution planning platform may transform classification from a multilabel-classification problem to multiple, single-classification problems, thereby reducing processing utilization.

Additionally, as a third step, the debt resolution planning platform may determine a Hamming Loss Metric relating to an accuracy of a label in performing a classification by using the validation set of the data. As a fourth step, the debt resolution planning platform may finalize the model based on labels that satisfy a threshold accuracy associated with the Hamming Loss Metric, and may use the model for subsequent prediction of whether certain user inputs (e.g., values or ranges), certain account data (e.g., values or ranges), and/or the like, for a user account are to result in the user account likely charging off or not likely charging off during the predetermined time period. Accordingly, the debt resolution planning platform may use any number of artificial intelligence techniques, machine learning techniques, deep learning techniques, and/or the like to determine predictive charge off scores that indicate whether a user account is or is not likely to charge off during a predetermined time period.

As further shown in FIG. 1B, and by reference number 112, the debt resolution planning platform may determine that an account may likely charge off in the future, and may determine or generate one or more plan parameters associated with an accelerated charge off plan. In this way, the debt resolution planning platform may conserve computing resources (e.g., processor resources, memory resources, and/or the like) that would otherwise be wasted in attempting to negotiate and enroll a user account in an arbitrary debt management plan that may ultimately fail, due to a lack of intelligence, insight, and/or the like. In this way, a user may initiate a proactive user account charge off, and accelerate the time in which the user may repair the user's credit score.

In some implementations, the debt resolution planning platform may determine that a user account may charge off, or likely charge off, in the future based on a result of comparing the score (e.g., the predictive charge off score determined at 110) to a threshold. Where the score satisfies the threshold, the debt resolution planning platform may determine that the account may likely charge off and, thus, generate plan parameters for an accelerated charge off plan for the user account. Where the score does not satisfy the threshold, the debt resolution planning platform may determine that the account may not likely charge off and, thus, not generate plan parameters for an accelerated charge off plan for the user account.

In some implementations, the intelligent matching module of the debt resolution planning platform may determine the one or more plan parameters for an accelerated charge off plan using a model (e.g., a second model), such as intelligent plan parameter generating model or algorithm. The model may be used to automatically generate plan parameters associated with one or more accelerated charge off plans based on a predictive charge off score satisfying a threshold. Such parameters may include at least a first parameter indicating a repayment amount for an accelerated charge off plan, a second parameter indicating a repayment frequency for the accelerated charge off plan, and a third parameter indicating a repayment start date for the accelerated charge off plan. The model may determine the plan parameters based, at least in part, on one or more inputs, including the predictive charge off score, the user inputs (e.g., obtained at 106), and/or the account data (e.g., obtained at 108), as described herein. Additional factors, inputs, and/or data may be included in the model, where desired, for determining plan parameters associated with an accelerated charge off plan. As an example, additional factors, inputs, and/or data may include historical data associated with previous accelerated charge off plans, a current account balance associated with a user account, a past due status associated with the user account, charging privileges associated with the user account, a product code (e.g., a type of account) associated with the user account, random numbers (e.g., for testing purposes), and/or the like.

In some implementations, the debt resolution planning platform may use a machine learning technique to generate the plan parameters using the model. For example, the debt resolution planning platform may use collaborative filtering technique (e.g., user based collaborative filtering, account based collaborative filtering, and/or the like) to determine plan parameters based on filtering the user inputs and/or the account data in view of historical data. The account data being input to the machine learning model may provide data and insight associated with the user (e.g., the user's timeliness of making payments, the user's past payment history, and/or the like) and/or the user account (e.g., the current account balance, historical information on fees charged, historical information on interest, and/or the like). In this way, the data associated with the user and/or the user account may be used to intelligently generate the plan parameters. The model may obtain historical data for past accelerated charge off plans, including past plan parameters associated with a previous set of users and/or user accounts, and may use the historical data to determine new plan parameters corresponding to a new accelerated charge off plan, for a particular user. For example, where a user is prone to making late payments, the repayment amount and/or the payment frequency parameters for an accelerated charge off plan may be optimized, based on the historical data available for users having a complementary payment history.

In some implementations, the debt resolution planning platform may perform a training operation when generating the model to determine the plan parameters for accelerated charge off plans, and intelligently match the user account to the plan parameters. For example, the debt resolution planning platform may obtain the user inputs, account data, predictive charge off score, and/or historical data stored in a data structure, and portion the data into a training set, a validation set, a test set, and/or the like. In some implementations, the debt resolution planning platform may train the model to determine plan parameters based on the user inputs, account data, predictive charge off score, and/or historical data using, for example, an unsupervised training procedure based on the training set of data. For example, the debt resolution planning platform may perform dimensionality reduction to reduce the training set of data to a minimum feature set, thereby reducing an amount of processing required to train the model to determine the plan parameters, and may apply a classification technique, to the minimum feature set. The debt resolution planning platform may generate trained models, using the minimum feature set, to generate models based on thousands, millions, and/or the like of current and historic user inputs, current and/or historic account data, and/or the like, for determining the plan parameters associated with thousands, millions, and/or the like of accounts, thereby increasing an accuracy and consistency of the models. In this way, the debt resolution planning platform may analyze thousands, millions, or billions of data records for machine learning and model generation—a data set that cannot be processed objectively by a human actor.

As further shown in FIG. 1B, and by reference number 114, the debt resolution planning platform may transmit the plan parameters for at least one accelerated charge off plan, to the user, by way of the user device. Such plan parameters may include, for example, at least a first parameter indicating a repayment amount, a second parameter indicating a repayment frequency, and a third parameter indicating a repayment start date. In some implementations, the debt resolution planning platform may transmit the plan parameters, dynamically, by way of an interface (e.g., an interactive user interface, a communication interface, and/or the like). In some implementations, a single set of plan parameters associated with an accelerated charge off plan may be transmitted to the user. Additionally, or alternatively, multiple sets of plan parameters associated with multiple accelerated charge off plans may be transmitted to the user. In this way, the user may obtain multiple accelerated charge off plans, each customized for the user and/or the user account, using intelligence derived from the account data, user inputs, and/or the like, as described above. In this way, the user may obtain, in real time (e.g., relative to requesting a planning session), one or more accelerated charge off plans by which the user may optionally enroll to proactively close the user account, and consent to charging off a debt associated with the user account. In this way, delays associated with obtaining, enrolling, implementing, and/or allocating payments for an accelerated charge off plan may be greatly reduced. In this way, the user's debt may be proactively charged off, thus, allowing the user to accelerate the time to pay off the debt and/or regain control over the user's credit.

Figure 1C:
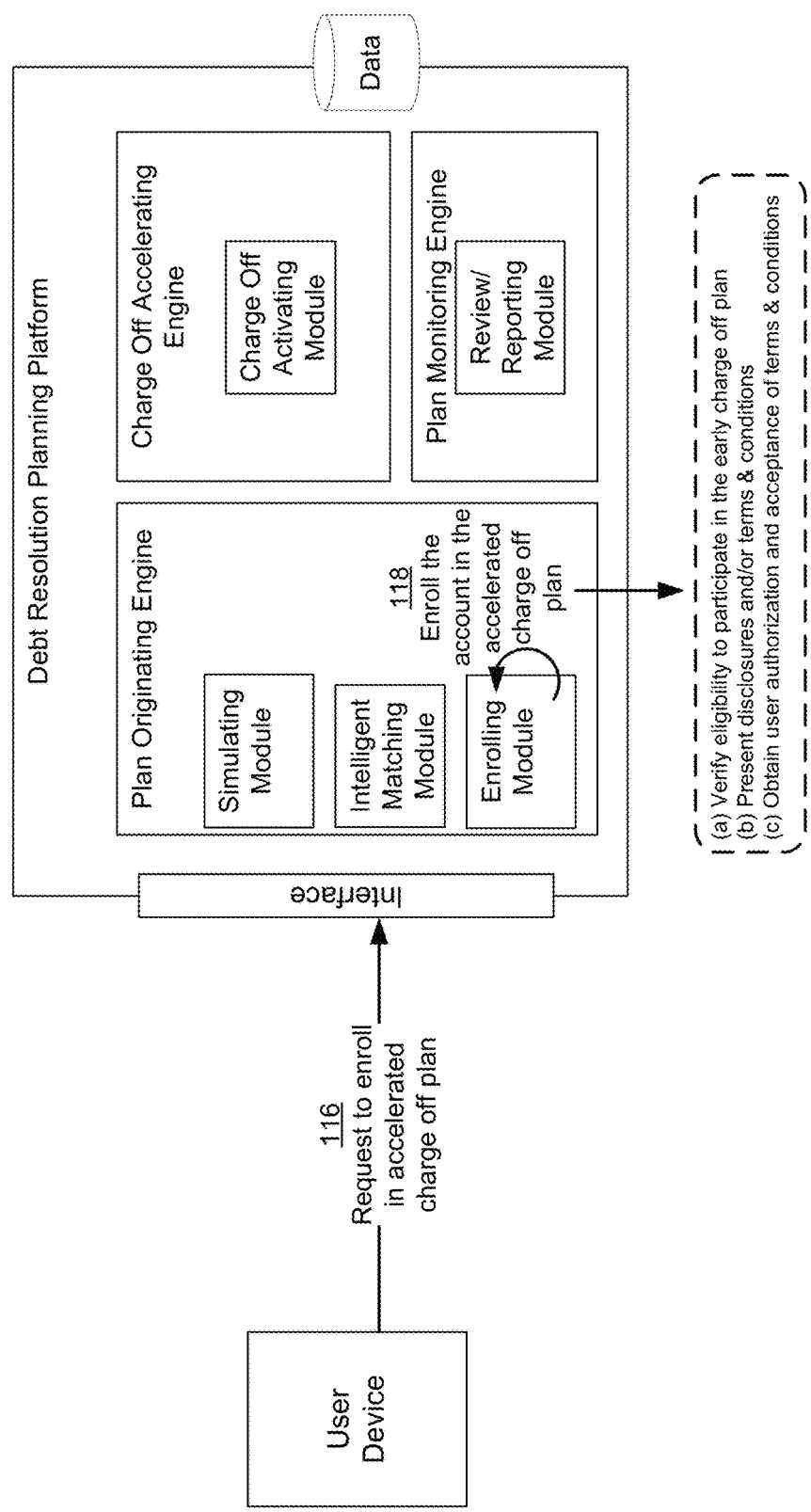

Turning now to FIG. 1C, and by reference number 116, the user may generate and send a request to enroll (e.g., opt in) the user account in an accelerated charge off plan determined by the debt resolution planning platform. In some implementations, the request may be generated and/or transmitted by the user device. For example, the user may interact with the debt resolution planning platform by way of one or more interactive links, web-based features, and/or the like, to select an accelerated charge off plan having desired plan parameters, and request enrollment of the user account in the selected accelerated charge off plan. In some implementations, the user may interact with the debt resolution planning platform by way of a user interface disposed on the user device to request enrollment in the accelerated charge off plan.

As further shown in FIG. 1C, and by reference number 118, the debt resolution planning platform may, automatically and/or in real time (e.g., relative to receiving a request to enroll in the accelerated charge off plan), enroll the user account in the accelerated charge off plan. Upon enrolling the user account in the accelerated charge off plan, the debt resolution planning platform may automatically perform one or more actions. Such actions may include, for example, verifying eligibility to participate in the accelerated charge off plan, presenting, to the user, disclosures associated with enrolling in the accelerated charge off plan, presenting, to the user, terms and/or conditions associated with enrolling in the accelerated charge off plan, obtaining the user's authorization to enroll in the accelerated charge off plan, obtaining the user's acceptance of the terms and/or conditions associated with enrolling in the accelerated charge off plan, obtaining a payment method for paying a debt associated with the user account enrolled in the accelerated charge off plan, and/or combinations thereof, and/or the like. In this way, several different stages of a process for enrolling a user account in an accelerated charge off plan may be automated, which may remove human subjectivity, waste, and/or fraud from the process, and which may improve speed and efficiency of the process and conserve computing resources.

In some implementations, the debt resolution planning platform may, optionally, verify eligibility of the user and/or the user account to participate in the accelerated charge off plan. For example, the debt resolution planning platform may compare account data obtained for the user account to one or more eligibility thresholds established by a creditor. In this way, creditors may provide optional qualifiers for which user accounts may be eligible for participation in an accelerated charge off plan. As an example, an eligibility threshold may be associated with an account balance (e.g., an amount of a debt), a payoff term or cycle, and/or the like. As a specific example, a user account may be denied participation in an accelerated charge off plan where an account balance exceeds a threshold (e.g., $5,000 or more, $7,000 or more, $10,000 or more, and/or the like). As another example, a user account may be denied participation in an accelerated charge off plan where a payoff term for an accelerated charge off plan exceeds a threshold (e.g., 24 months, 36 months, 60 months, and/or the like). In this way, the number of accelerated charge off plans may be selectively throttled in an effort to balance cash reserves, satisfy regulatory requirements, and/or the like.

Figure 1D:
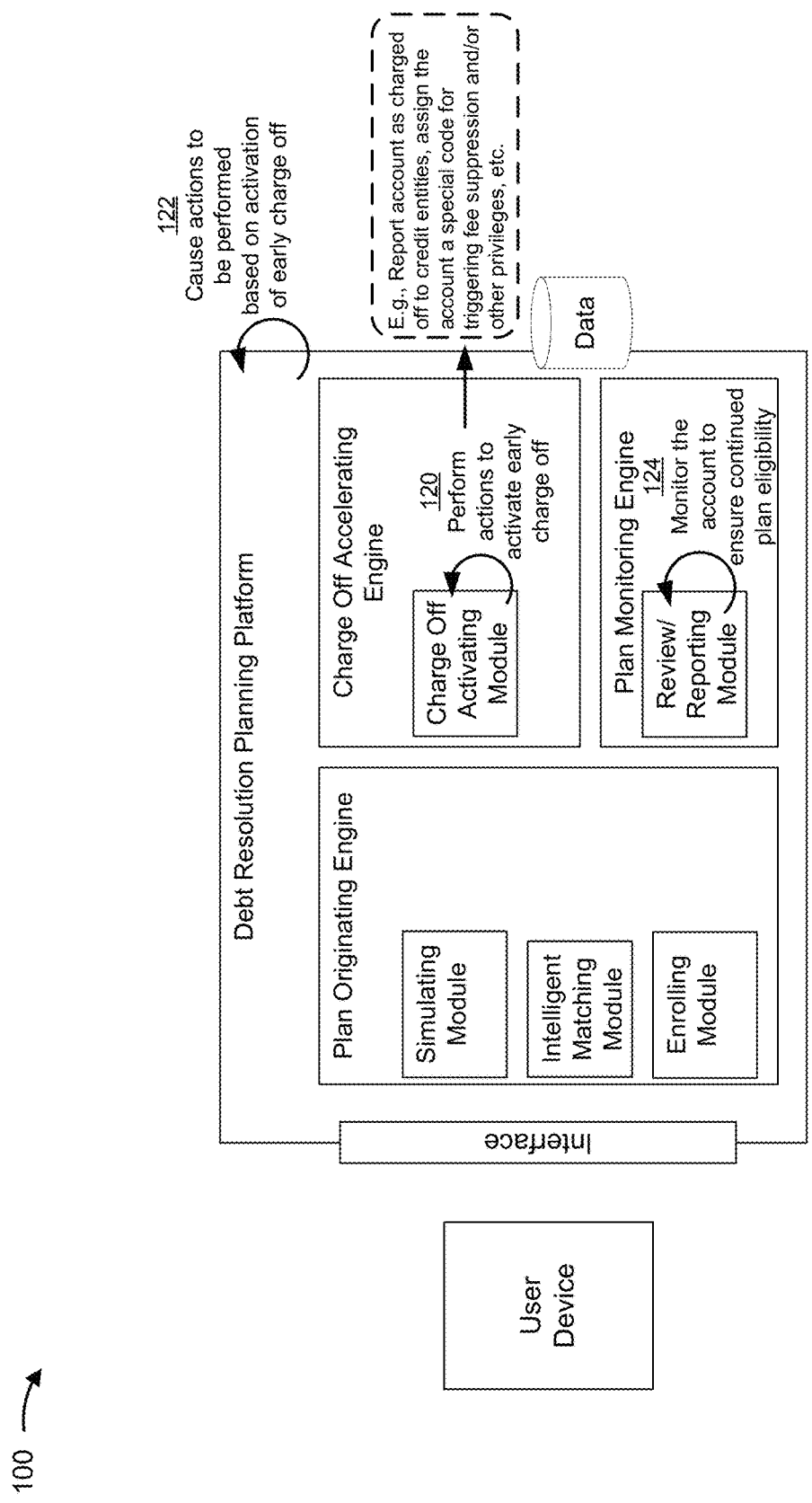

Turning now to FIG. 1D, and by reference number 120, the charge off activating engine, of the debt resolution planning platform, may employ the charge off activating module to perform one or more actions to activate an early charge off, of a debt, associated with a user account enrolled in an accelerated charge off plan. Such actions may include, for example, reporting an account as being charged off to one or more credit entities (e.g., credit bureaus), assigning the user account one or more charge off codes, revoking charging privileges for the user account, routing (e.g., moving) the user account to a separate system of record and/or case management system (e.g., a separate system that manages charge off accounts), combinations thereof, and/or the like.

In some implementations, the debt resolution planning platform may assign the user account a code (e.g., a first code), whereby charging privileges may be revoked and/or transactions may be prohibited for the user account based on the presence or detection of the code. In some implementations, the debt resolution planning platform may assign the user account a code (e.g., a second code), whereby interest may be precluded (e.g., suppressed) from accumulating on a debt associated with the user account based on the presence or detection of the code. In some implementations, the debt resolution planning platform may assign the user account a code (e.g., a third code), whereby fees may be precluded from accumulating on a debt associated with the user account based on the presence or detection of the code. In some implementations, the debt resolution planning platform may assign the user account a code (e.g., a fourth code), whereby collection communications may be suppressed for the user account based on the presence or detection of the code. In this way, various actions (e.g., fee suppression, interest suppression, etc.) may be selectively performed based on the presence of one or more codes assigned to a user account. In this way, the one or more codes may selectively trigger performance and/or non-performance of one or more actions. In some implementations, the debt resolution planning platform may detect the presence of one or more codes, and selective perform various actions based on detecting the presence of the one or more codes.

As further shown in FIG. 1D, and by reference number 122, the debt resolution planning platform may cause one or more actions to be performed based on activating the early charge of off the user account. Such actions may include, for example, suspending or reducing late fees associated with the user account (e.g., based on the presence of a code), suspending or reducing interest associated with the user account, reducing a minimum payment associated with the user account, suspending collection communications (e.g., collection e-mails, letters, telephone calls, and/or the like) associated with the user account, and/or the like. In this way, the user may receive one or more benefits (e.g., suspended fees, suspended interest, and/or the like) upon enrolling the user account in the accelerated charge off plan. In this way, the user may accelerate payment of a debt, and minimize damage to a credit score.

Additionally, and in some implementations, suspending collection communications may further conserve computing resources (e.g., of a creditor, a banking provider, a financial institute, and/or the like) that would otherwise be wasted determining late fees, accruing late fees, generating and sending out late notices associated with a delinquent account, reporting delinquency to a credit agency, performing collections activities, and/or the like. In this way, postal resources that would otherwise be wasted in processing and/or sending collection communications may be conserved. In this way, computing resources of a user device that would otherwise be wasted in receiving, processing, and/or accessing collection communications may be conserved. In turn, network resources that would otherwise be wasted in communicating collection notices may be conserved. In this way, the user may feel experienced improved customer satisfaction by way of feeling more in control of an otherwise helpless situation upon requesting, selecting, and/or enrolling in an accelerated charge off plan.

In some implementations, the debt resolution planning platform may automatically close a user account and inform a credit entity that the user account has charged off, upon enrollment of the user account in an accelerated charge off plan. Upon completing the accelerated charge off plan, the debt resolution planning platform may automatically inform the credit entity that the charged off account has been paid in full, and the credit entity may be caused to reevaluate, and possibly increase, the user's credit score. In some implementations, the debt resolution planning platform may automatically generate and send an enrollment communication to the user upon enrollment of the user account in an accelerated charge off plan. For example, the debt resolution planning platform may generate and send an e-mail communication to the user confirming enrollment of the user account in the accelerated charge off plan, a letter (e.g., postal delivery) to the user confirming enrollment of the user account in the accelerated charge off plan, a text message communication to the user confirming enrollment of the user account in the accelerated charge off plan, and/or the like.

As further shown in FIG. 1D, and by reference number 124, the debt resolution planning platform may monitor the user account, to ensure continued plan eligibility for the user account enrolled in the accelerated charge off plan. For example, the debt resolution planning platform may periodically review payment amounts associated with the user account enrolled in the accelerated charge off plan, payment dates associated with the user account enrolled in the accelerated charge off plan, and/or the like, to determine whether the user of the user account continues to satisfy and/or comply with the terms and/or conditions associated with the accelerated charge off plan, for which the user account is enrolled.

In some implementations, the debt resolution planning platform is configured to monitor activity associated with the accelerated charge off plan, detect completion of the accelerated charge off plan, and notify a credit entity that the user account is paid in full based on detecting completion of the accelerated charge off plan. In some implementations, the debt resolution planning platform may detect completion of the accelerated charge off plan based on detecting an account balance of zero. In some implementations, the debt resolution planning platform may automatically notify the credit entity that the user account is paid in full based on detecting completion of the accelerated charge off plan. In this way, delays associated with reevaluating the user's credit score may be minimized or reduced. In this way, the user may accelerate the repair and/or restoration of a user's credit score.

In some implementations, the debt resolution planning platform is configured to monitor activity associated with the accelerated charge off plan, determine noncompliance with the accelerated charge off plan, and terminate the accelerated charge off plan. In some implementations, the debt resolution planning platform may determine noncompliance with the accelerated charge off plan based on determining one or more missed payments for a user account, determining one or more late payments for a user account, determining one or more insufficient payments for the user account, and/or the like. In this way, users that break, cancel, or fail to comply with the accelerated charge off plan may be discontinued from participating in the accelerated charge off plan (e.g. automatically disenrolled from the accelerated charge off plan), and optionally provided with an alternative recovery strategy.

In this way, users may request enrollment in and/or enroll in accelerated charge off plans, automatically, in relatively short amounts of time (e.g., less than 30 minutes, less than 10 minutes, less than 5 minutes, and/or the like), without having to experience delays associated with waiting on third-party credit counseling firms to negotiate with creditors, on behalf of the users. In this way, several different stages of a process for implementing intelligent debt resolution planning and/or enrollment in an accelerated charge off plan may be automated, which may remove human subjectivity and waste from the process, and which may improve speed and efficiency of the process and conserve computing resources (e.g., processor resources, memory resources, and/or the like). Furthermore, implementations described herein employ a rigorous, computerized process to perform tasks or roles that were not previously performed or were previously performed using subjective human intuition or input. For example, currently there does not exist a technique for providing debt resolution plans that accelerate charge off, of an account. Finally, automating the process for implementing intelligent debt resolution planning conserves computing resources (e.g., processor resources, memory resources, and/or the like) that would otherwise be wasted in attempting to negotiate and enroll a user in a debt management plan that may ultimately fail, due to a lack of intelligence, insight, and/or the like.

Additionally, in some implementations, allowing a user to pay off a debt that has been charged off enables the user to inhibit or avoid long-term damage to the user's credit score, as the debt resolution planning platform may automatically inform a credit entity that a charged off debt has been repaid where a user satisfies an accelerated charge off plan to completion. The accelerated charge off plan may automatically close a delinquent account, pro-actively charge off a debt, and/or automatically report the debt as being charged off to a credit entity. In this way, the debt resolution planning platform may intelligently analyze user accounts, and accelerate the charge off for user accounts that are predicted to charge off in the future.

As indicated above, FIGS. 1A-1D are provided merely as an example. Other examples are possible and may differ from what is shown and described with regard to FIGS. 1A-1D.

FIGS. 2A-2H are diagrams of user interfaces associated with implementing debt resolution planning for accelerating charge off as described herein.

Figure 2A:
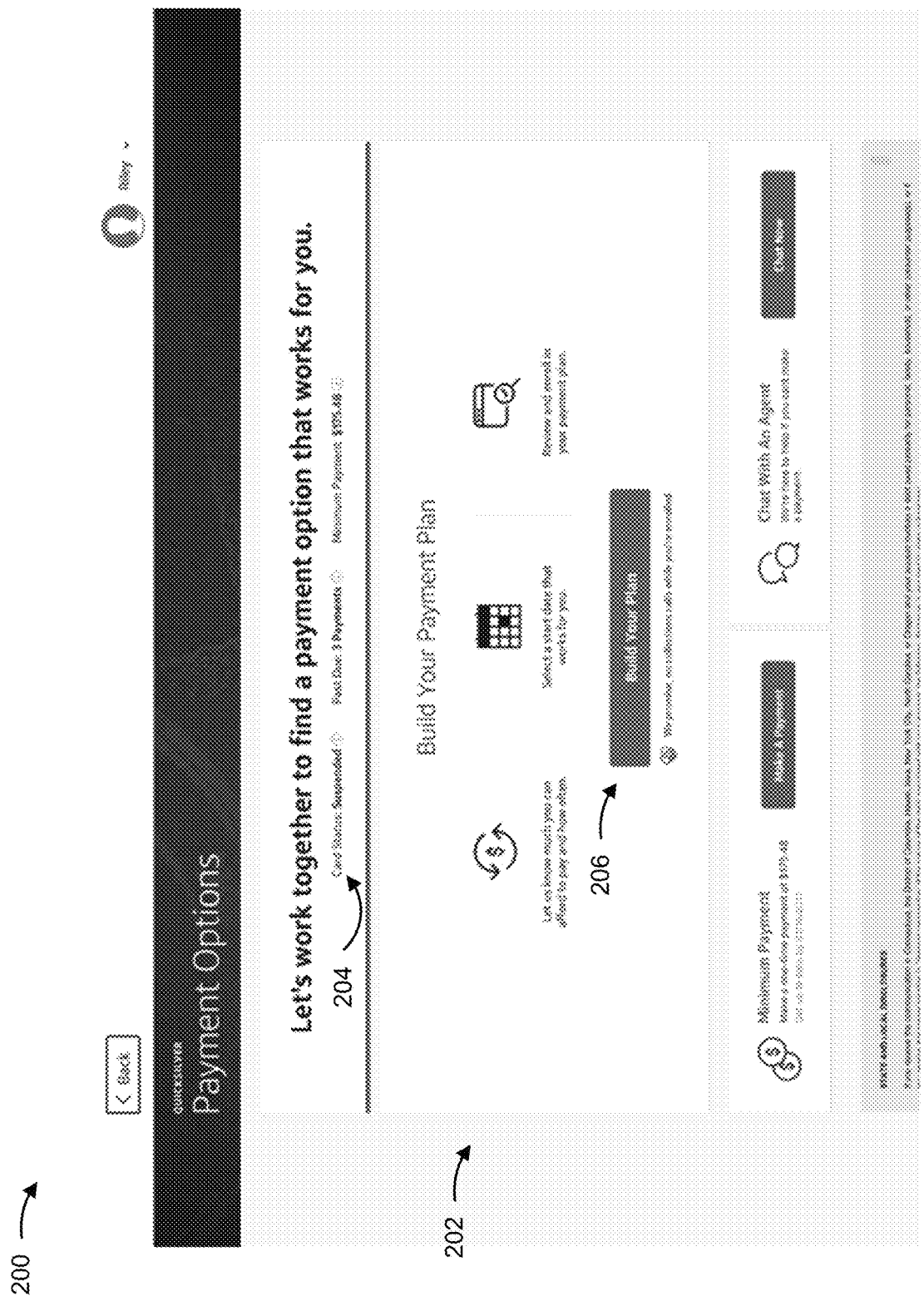
FIGS. 2A-2H are diagrams of user interfaces associated with implementing debt resolution planning for accelerating charge off as described herein.

Turning now to FIG. 2A, a first user interface view 200 of a first user interface 202 provided by a debt resolution planning platform is provided. First user interface 202 may provide a user an opportunity to enroll a user account in a debt resolution plan offered by a creditor. As first user interface 202 indicates by reference number 204, the user account may be suspended as a result of being past due (i.e., delinquent) by three payments, and include a minimum payment amount of $175.48. For users unable to pay the full $175.48, the user may opt in to enrolling the user account in a debt resolution plan, such as an accelerated charge off plan, whereby the creditor may accelerate a charge off of the user account, upon the user's consent, to reduce a minimum payment associated with the user account, suspend interest from being applied to the user account, suspend fees (e.g., late fees) from being applied to the user account, and/or the like, in consideration for the user's participation in the accelerated charge off plan. The user may interact with the debt resolution planning platform, and initiate building of a debt resolution plan, by clicking one or more interactive links 206.

Figure 2B:
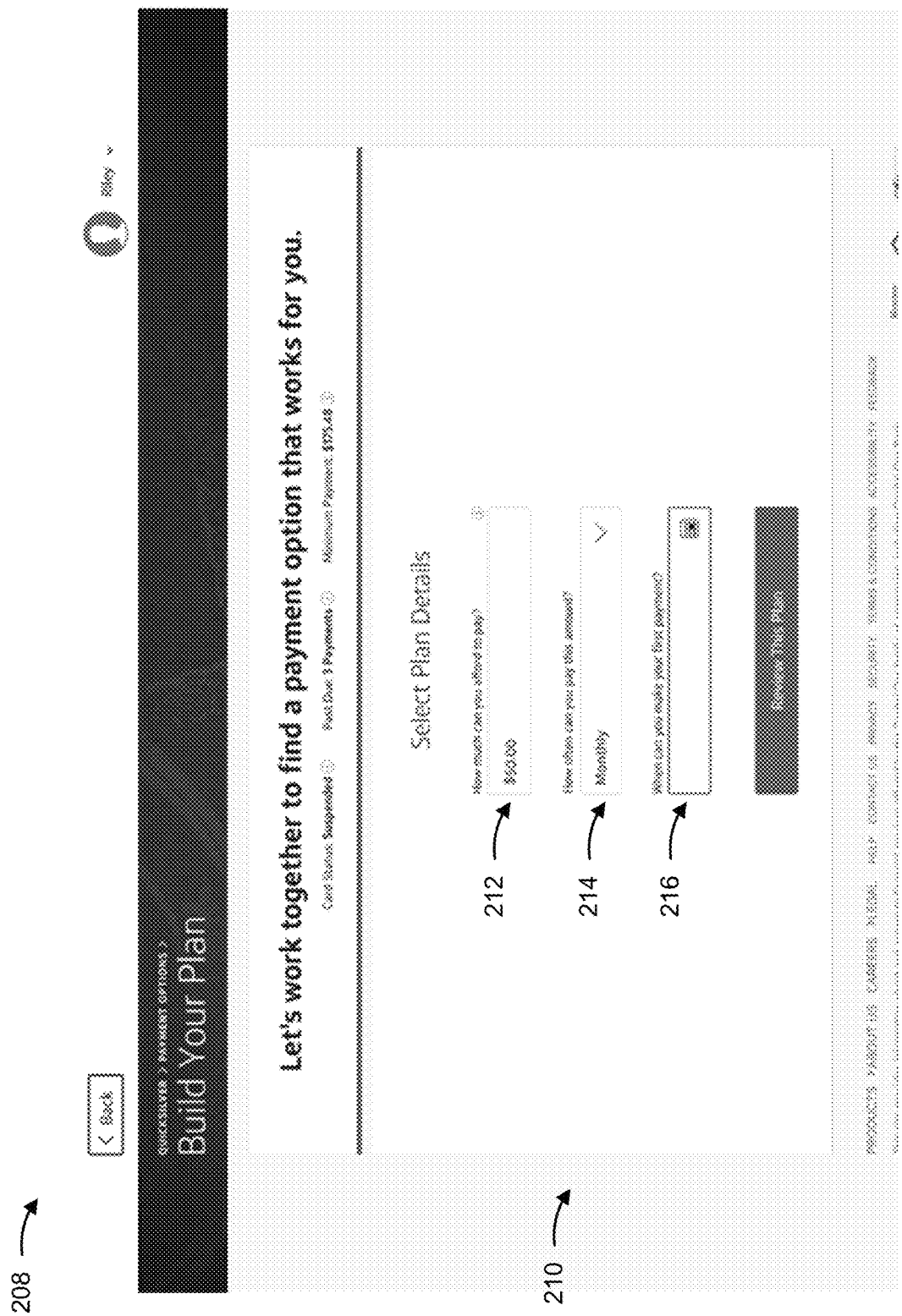

Turning now to FIG. 2B, a second user interface view 208 of a second user interface 210 of a debt resolution planning platform is provided. Second user interface 210 may prompt a user to enter one or more user inputs for use in determining whether the user account is eligible for participation in an accelerated charge off plan (e.g., based on a score) and/or for use in determining plan parameters associated with the accelerated charge off plan, as described above. As FIG. 2B illustrates, a user may enter a first input 212 corresponding to a payment amount that a user may be able to pay towards a balance of the user account, a second input 214 corresponding to a frequency at which the payment amount may be applied to the user account, and a third input 216 corresponding to a start date that the user may begin the debt resolution plan. The user may input such amounts by way of one or more interactive features (e.g., dropdown boxes, interactive calendars, interactive fields, and/or the like) provided by and/or displayed by way of second user interface 210.

Figure 2C:
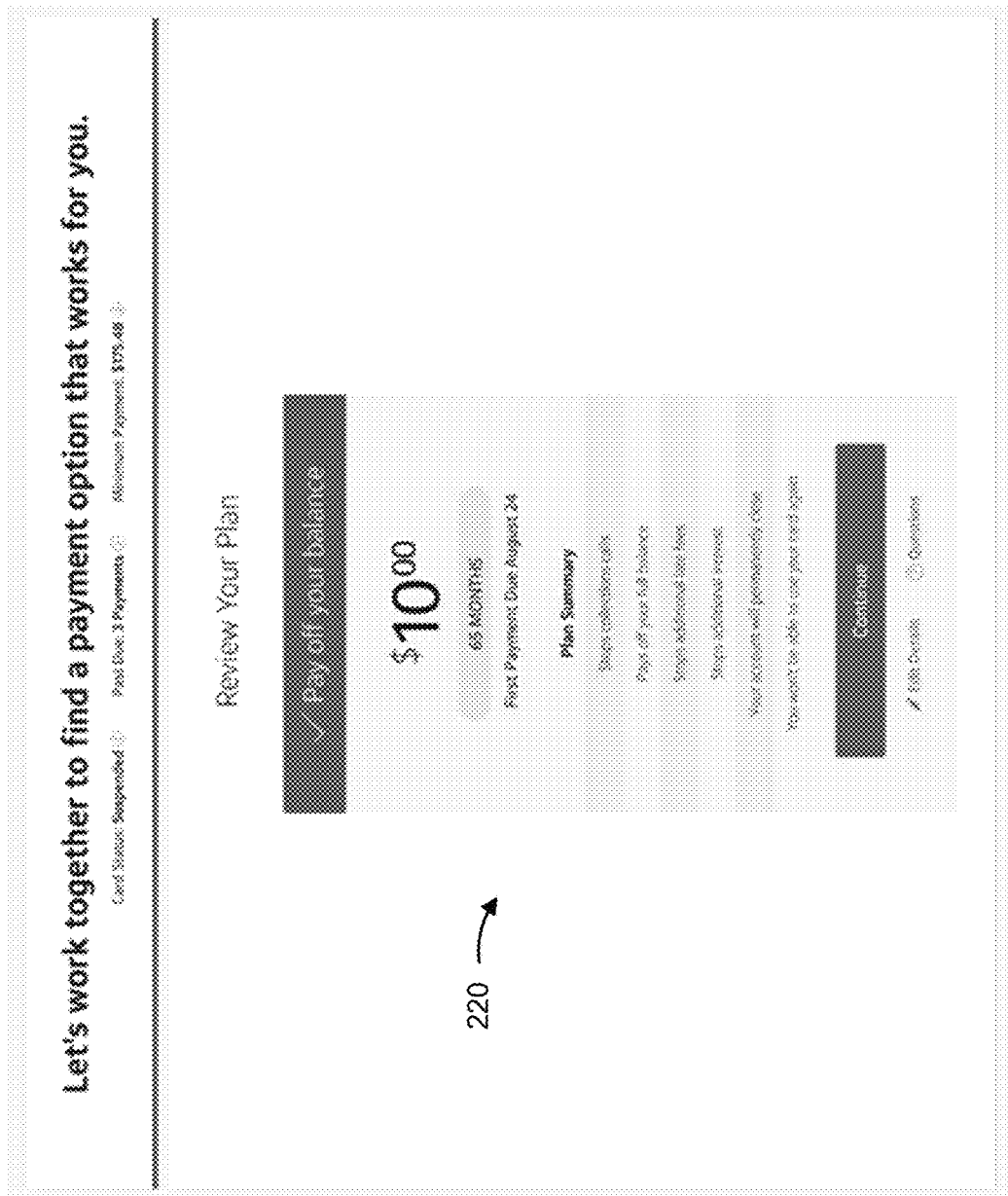

Turning now to FIG. 2C, a third user interface view 218 of a third user interface 220 of a debt resolution planning platform is provided. Third user interface 220 may display plan parameters for an accelerated charge off plan, as determined by the debt resolution planning platform. As described above, the debt resolution planning platform may employ one or more machine learning models or algorithms configured to input the user inputs and/or account data obtained by the debt resolution planning platform, and output one or more plan parameters associated with an accelerated charge off plan. In some implementations, the plan parameters may include at least first parameter indicating a repayment amount (e.g., $10.00), a second parameter indicating a repayment frequency (e.g., 65 months), and a third parameter indicating a repayment start date (e.g., August 24).

As FIG. 2C further illustrates, collection calls may be suspended, fees may be suspended, and/or interest may be suspended upon enrollment of the user account in the accelerated charge off plan. In some implementations, the user may relinquish charging privileges upon enrolling the user account in the accelerated charge off plan. Upon completion of the accelerated charge off plan, the debt resolution planning platform may automatically inform the credit entity that the charged off debt has been paid in full, so that the credit entity may be caused to efficiently reevaluate the user's credit score, thus, allowing the user to exert more control over the user's credit, and more quickly repair the user's credit score. In some implementations, the user may select a plan, and request enrollment in the selected plan by clicking one or more interactive links associated with the debt resolution planning platform.

Figure 2D:
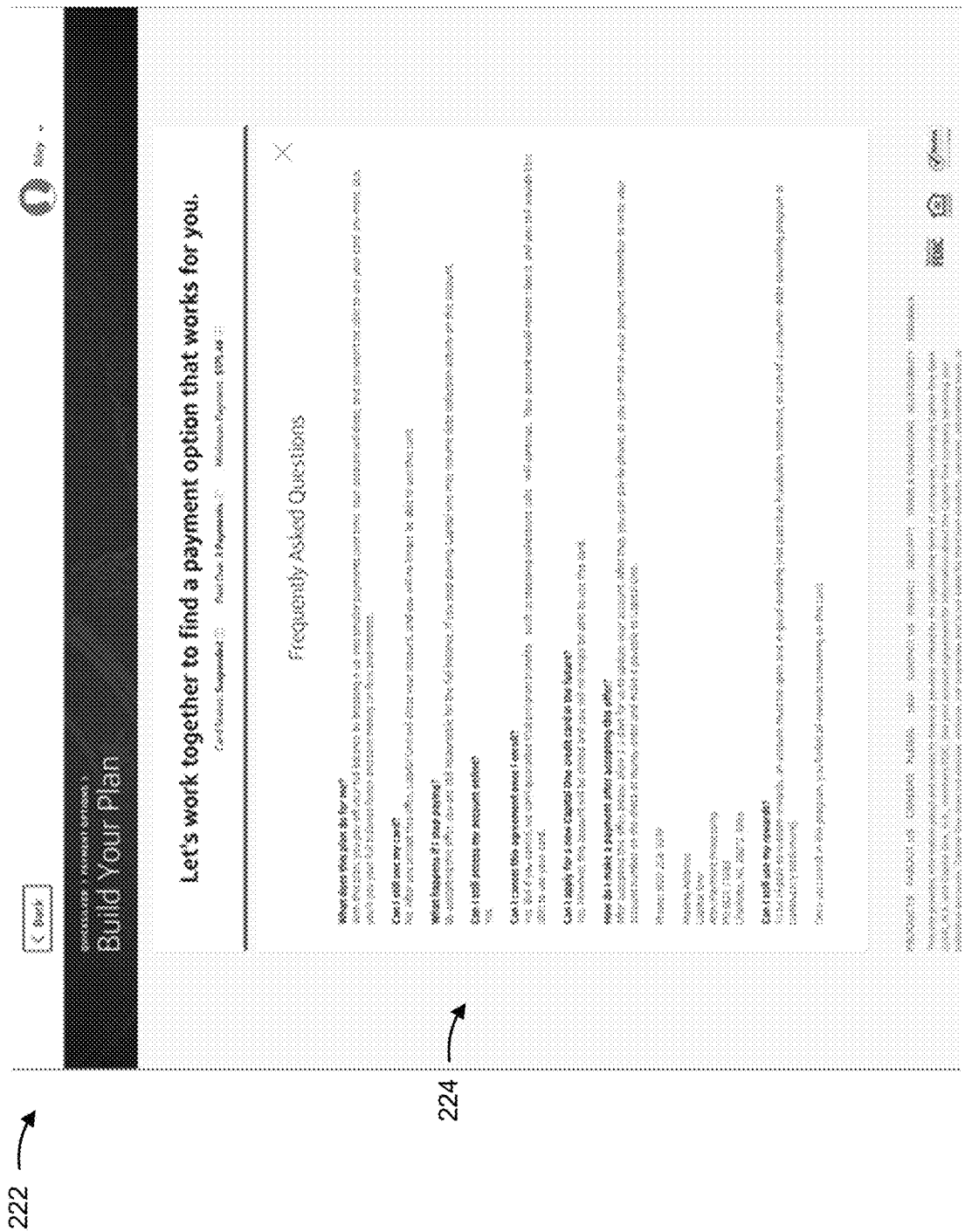

Turning now to FIG. 2D, a fourth user interface view 222 of a fourth user interface 224 of a debt resolution planning platform is provided. Fourth user interface 224 may automatically display answers to frequently asked questions regarding accelerated charge off plans. In this way, resources (e.g., computing resources, network resources, and/or the like) that would otherwise be wasted in connecting the user to a customer service agent, training the customer server agent, and/or the like, may be reduced, minimized, and/or obviated.

Figure 2E:
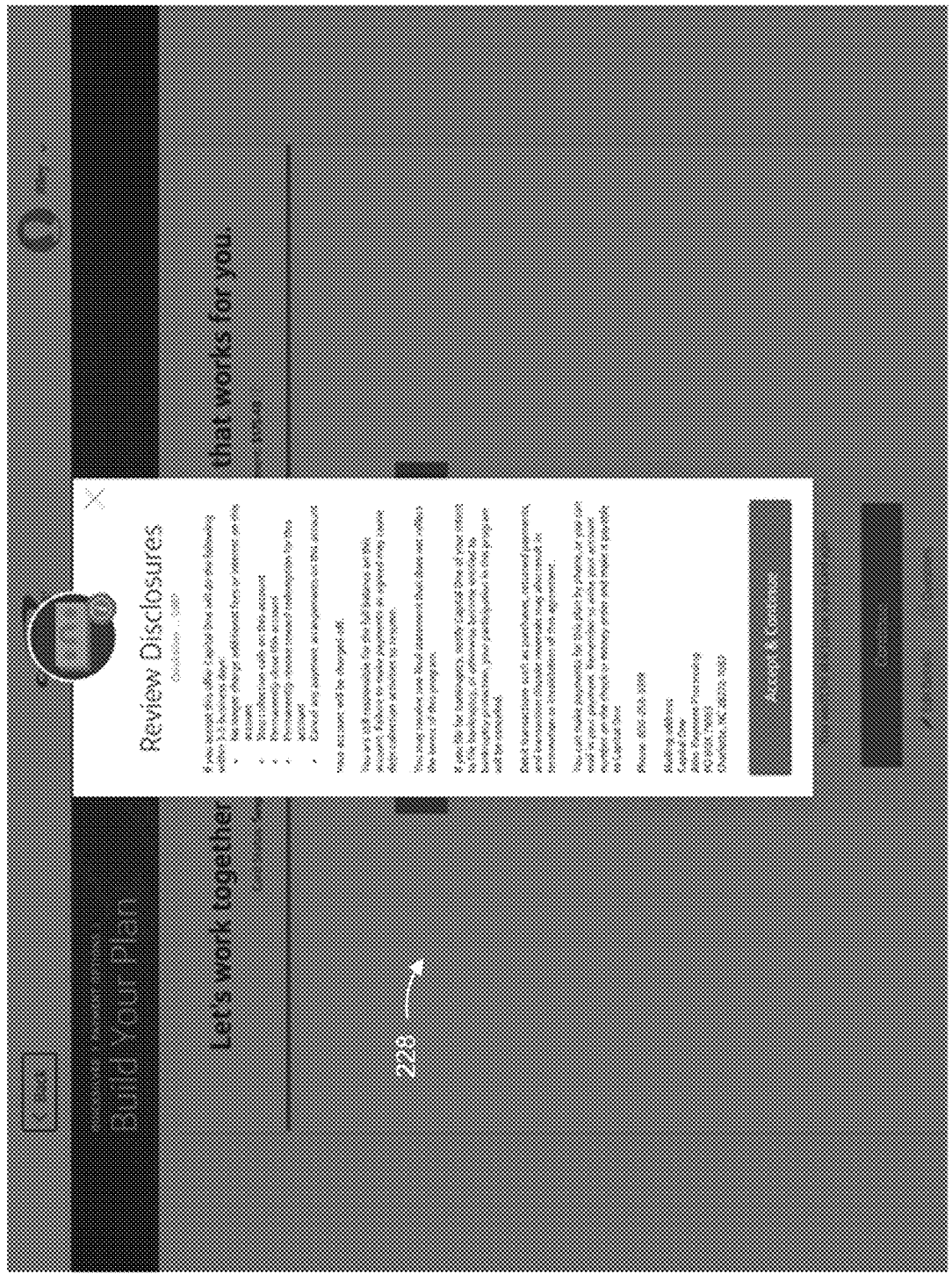

Turning now to FIG. 2E, a fifth user interface view 226 of a fifth user interface 228 of a debt resolution planning platform is provided. In some implementations, fifth user interface 228 is configured to automatically display, to a user, certain disclosures, including certain terms and/or conditions, associated with enrolling the user account in an accelerated charge off plan. Example disclosures may specify one or more actions that may occur upon enrollment in an accelerated charge off plan (e.g., the account may be permanently closed, reward redemption may be revoked, and/or the like), failure to comply with the accelerated charge off plan (e.g., reinstatement of collection activities), and/or the like. In some implementations, the user may indicate acceptance of the disclosures by way of clicking one or more interactive links associated with fifth user interface 228. In this way, the entire process for determining and enrolling in an accelerated charge off plan may be streamlined and/or automated. In this way, computing resources and/or network resources that would otherwise be wasted in attempting to negotiate and enroll a user in a debt management plan that may ultimately fail, due to a lack of intelligence, insight, and/or the like, may be conserved.

Figure 2F:
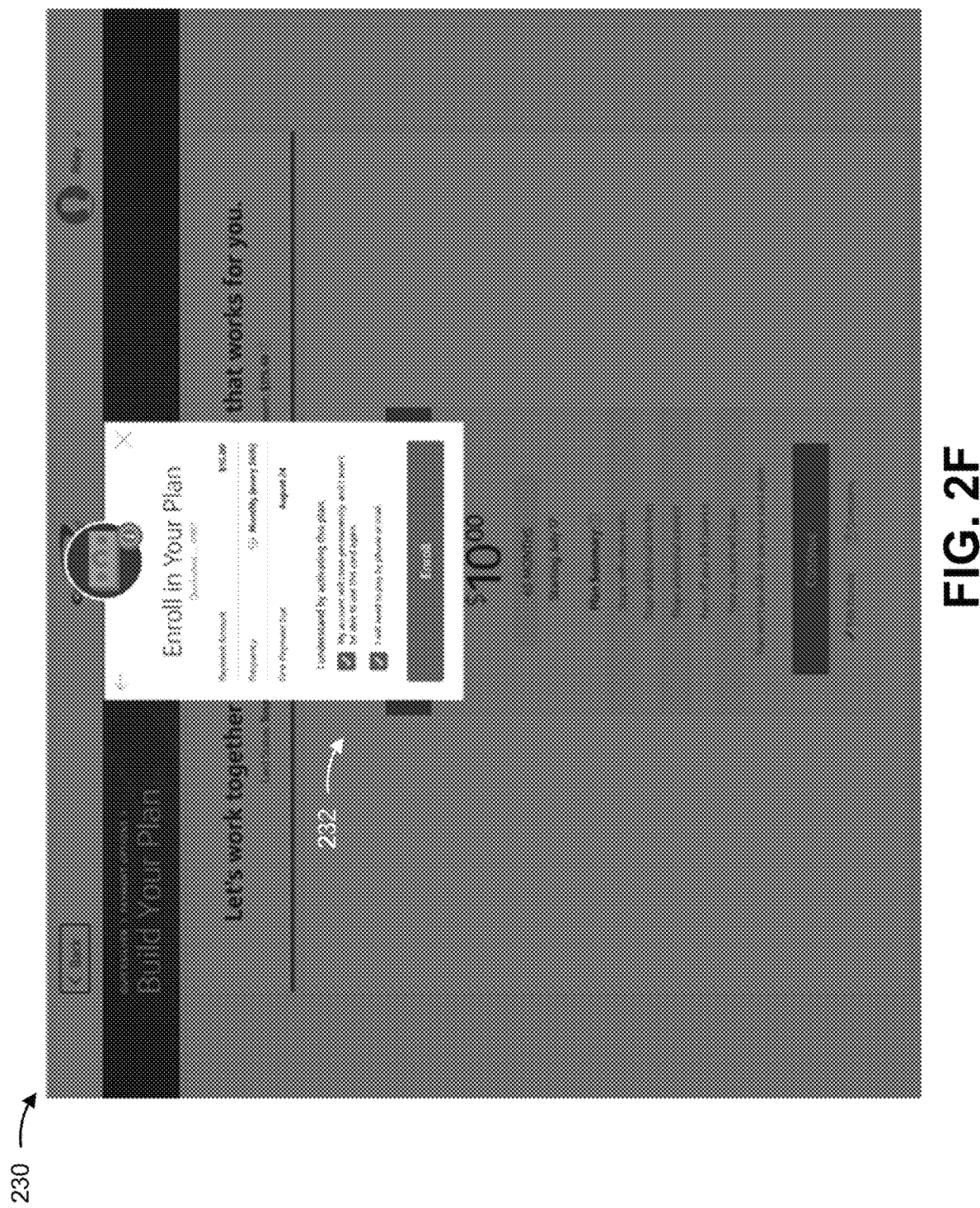

Turning now to FIG. 2F, a sixth user interface view 230 of a sixth user interface 232 of a debt resolution planning platform is provided. Sixth user interface 232 may include an overview or summary of plan parameters for the accelerated charge off plan. As FIG. 2F illustrates, the start date, the payment frequency, and the payment amount may be visually displayed to the user. The user may additionally opt in or enroll in the play by way of clicking one or more interactive links associated with sixth user interface 232.

Figure 2G:
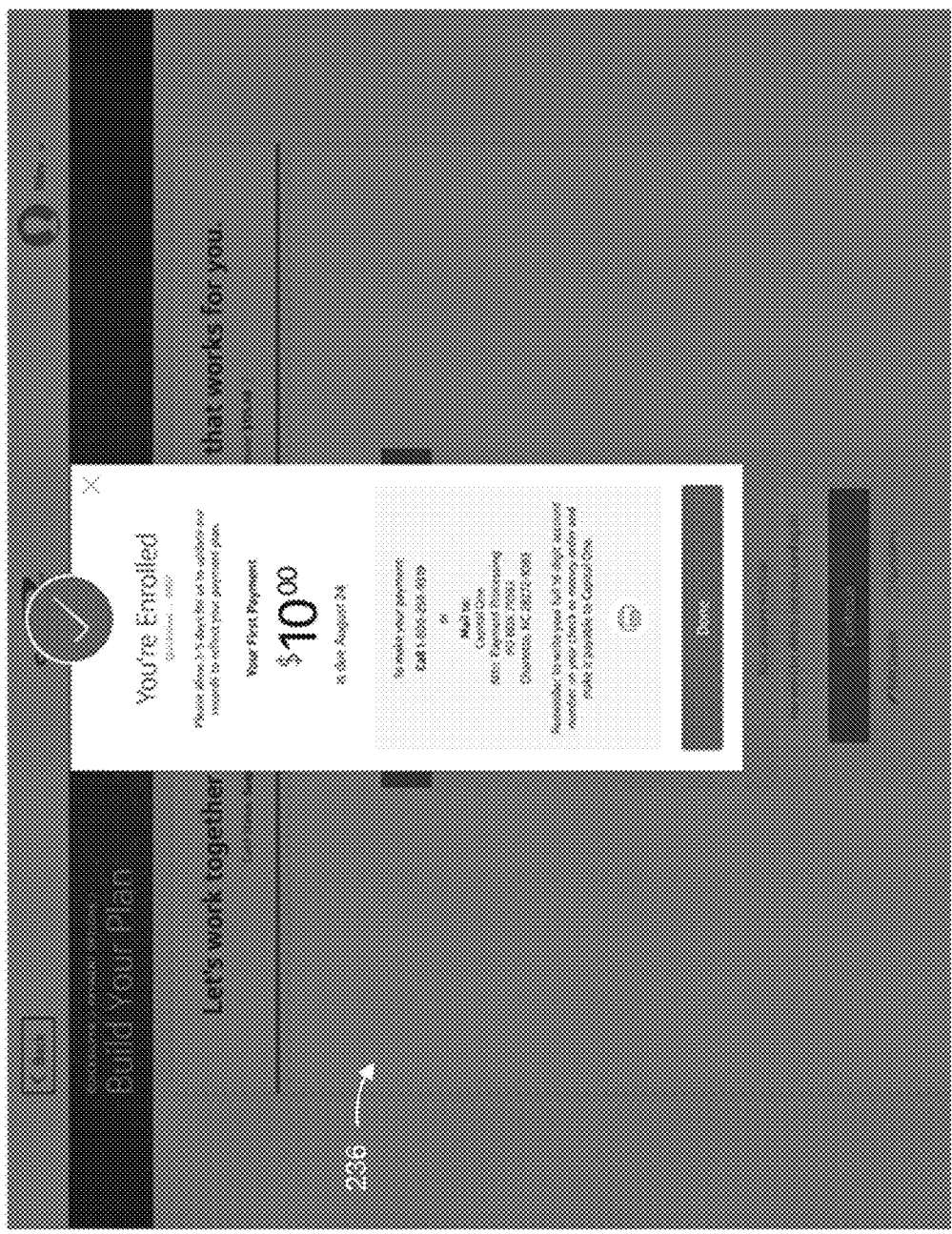

Turning now to FIG. 2G, a seventh user interface view 234 of a seventh user interface 236 of a debt resolution planning platform is provided. Seventh user interface 236 may include a visual display confirming the user's enrollment in an accelerated charge off plan. The visual display may provide payment information, where desired. Additionally, or alternatively, the user may enter payment information during enrollment in the accelerated charge off plan. In this way, computing resources and/or network resources that would otherwise be wasted in connecting the user to a customer service agent and specifying payment information over the phone may be conserved.

Figure 2H:
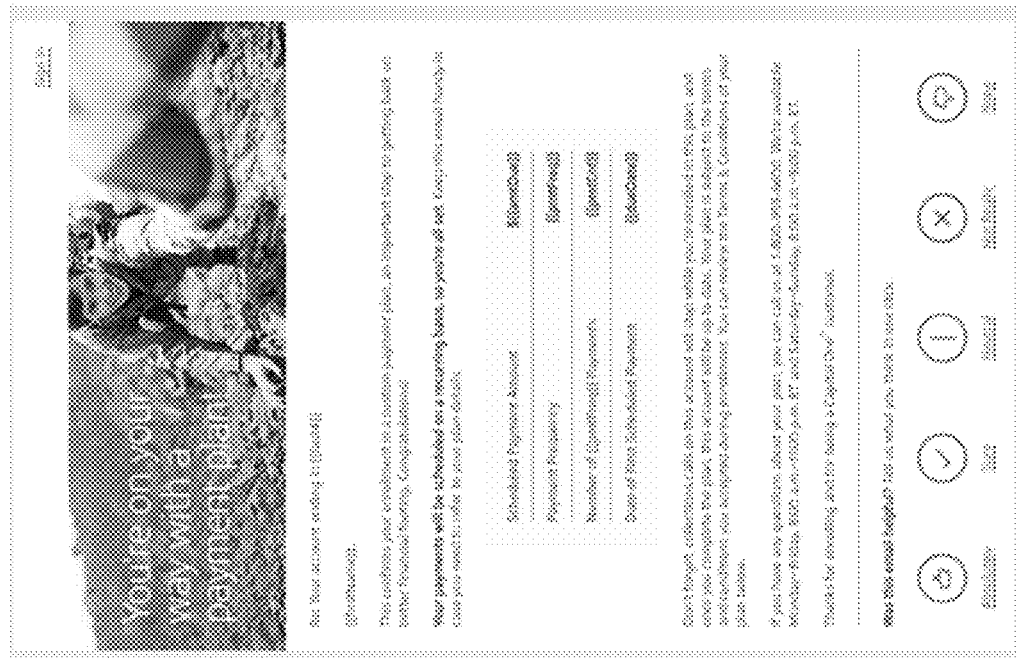

Turning now to FIG. 2H, an eighth user interface view 238 of an eighth user interface 240 of a debt resolution planning platform is provided. In some implementations, the debt resolution planning platform may generate and send an enrollment communication to the user upon enrolling the user account in an accelerated charge off plan. Eighth user interface 240 illustrates an example enrollment communication. As FIG. 2H illustrates, the enrollment communication may include a summary of the terms and/or conditions associated with an accelerated charge off plan, an overview or summary of plan parameters for the accelerated charge off plan, and/or the like.

It will be understood that FIGS. 2A-2H are provided merely as examples. Other examples are possible and may differ from what is shown and described with regard to FIGS. 2A-2H.

Figure 3:
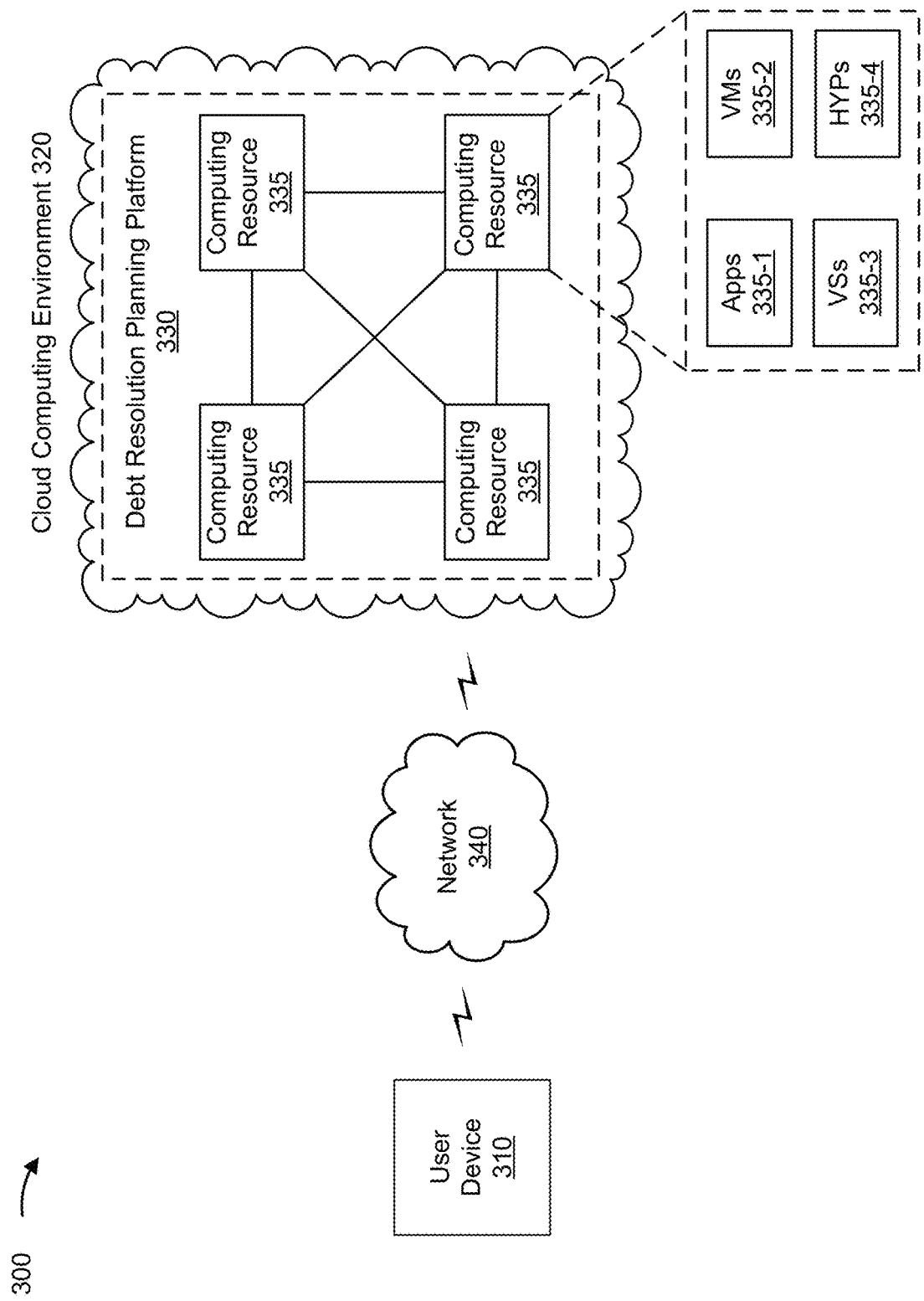
FIG. 3 is a diagram of an example environment in which devices, systems, and/or methods, described herein, may be implemented.

FIG. 3 is a diagram of an example environment 300 in which devices, systems, and/or methods, described herein, may be implemented. As shown in FIG. 3, environment 300 may include one or more user devices 310, a cloud computing environment 320, a debt resolution planning platform 330, and one or more computing resources 335. Devices of environment 300 may interconnect via wired connections, wireless connections, or a combination of wired and wireless connections.

User device 310 may include one or more devices capable of receiving, generating, storing, processing, and/or providing information associated with facilitating debt resolution planning, whereby a user, may obtain, select, and enroll in an accelerated charge off plan by way of user device 310. For example, user device 310 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Cloud computing environment 320 may include an environment that delivers computing as a service, whereby shared resources, services, etc., may be provided to debt resolution planning platform 330 for use in providing intelligent, customizable debt resolution planning and accelerated account charge off. Cloud computing environment 320 may provide computation, software, data access, storage, and/or other services that do not require end-user knowledge of a physical location and configuration of a system and/or a device that delivers the services. As shown, cloud computing environment 320 may include debt resolution planning platform 330 and one or more computing resources 335.

Debt resolution planning platform 330 may include one or more devices capable of receiving, generating, storing, processing, and/or providing information associated with facilitating debt resolution planning and/or accelerated account charge off, whereby a user may obtain, select, and/or enroll in an accelerated charge off plan by way of user device 310. While the example environment 300 indicates that debt resolution planning platform 330 as being implemented in a cloud computing environment 320, in some implementations, debt resolution planning platform 330 may be implemented by one or more other types of devices as well, such as a server, computer, laptop computer, tablet computer, handheld computer, or the like. Debt resolution planning platform 330 is capable of obtaining data provided by a user of user device 310 to intelligently determine, implement, schedule, and/or plan a customized debt resolution plan for a user. Debt resolution planning platform 330 may, in some implementations, include, or otherwise have access to other resources, that facilitate the intelligent determination, implementation, scheduling, and/or activation of accelerated charge off plans by way of executing models based on machine learning, historical data, and/or the like.

Computing resource 335 may include one or more personal computers, workstation computers, server devices, or another type of computation and/or communication device. In some implementations, computing resource 335 may host debt resolution planning platform 330. The cloud resources may include compute instances executing in computing resource 335, storage devices provided in computing resource 335, data transfer devices provided by computing resource 335, and/or the like. In some implementations, computing resource 335 may communicate with other computing resources 335 by way of wired connections, wireless connections, or a combination of wired and wireless connections.

As further shown in FIG. 3, computing resource 335 may include a group of cloud resources, such as one or more applications ("APPs") 335-1, one or more virtual machines ("VMs") 335-2, virtualized storage ("VSs") 335-3, one or more hypervisors ("HYPs") 335-4, and/or the like.

Application 335-1 may include one or more software applications that may be provided to or accessed by user device 310. Application 335-1 may eliminate a need to install and execute the software applications on user device 310. For example, application 335-1 may include software associated with debt resolution planning platform 330 and/or any other software capable of being provided via cloud computing environment 320. In some implementations, one application 335-1 may send/receive information to/from one or more other applications 335-1, via virtual machine 335-2.

Virtual machine 335-2 may include a software implementation of a machine (e.g., a computer) that executes programs like a physical machine. Virtual machine 335-2 may be either a system virtual machine or a process virtual machine, depending upon use and degree of correspondence to any real machine by virtual machine 335-2. A system virtual machine may provide a complete system platform that supports execution of a complete operating system ("OS"). A process virtual machine may execute a single program and may support a single process. In some implementations, virtual machine 335-2 may execute on behalf of a user (e.g., of user device 310, debt resolution planning platform 330, and/or the like), and/or may manage infrastructure of cloud computing environment 320, such as data management, synchronization, or long-duration data transfers.

Virtualized storage 335-3 may include one or more storage systems and/or one or more devices that use virtualization techniques within the storage systems or devices of computing resource 335. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 335-4 provides hardware virtualization techniques that allow multiple operating systems (e.g., "guest operating systems") to execute concurrently on a host computer, such as computing resource 335. Hypervisor 335-4 may present a virtual operating platform to the guest operating systems, and may manage the execution of the guest operating systems. Multiple instances of a variety of operating systems may share virtualized hardware resources.

Network 340 may include one or more wired and/or wireless networks. For example, network 340 may include a cellular network (e.g., a long-term evolution (LTE) network, a code division multiple access (CDMA) network, a 3G network, a 4G network, a 5G network, another type of next generation network, etc.), a communication network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
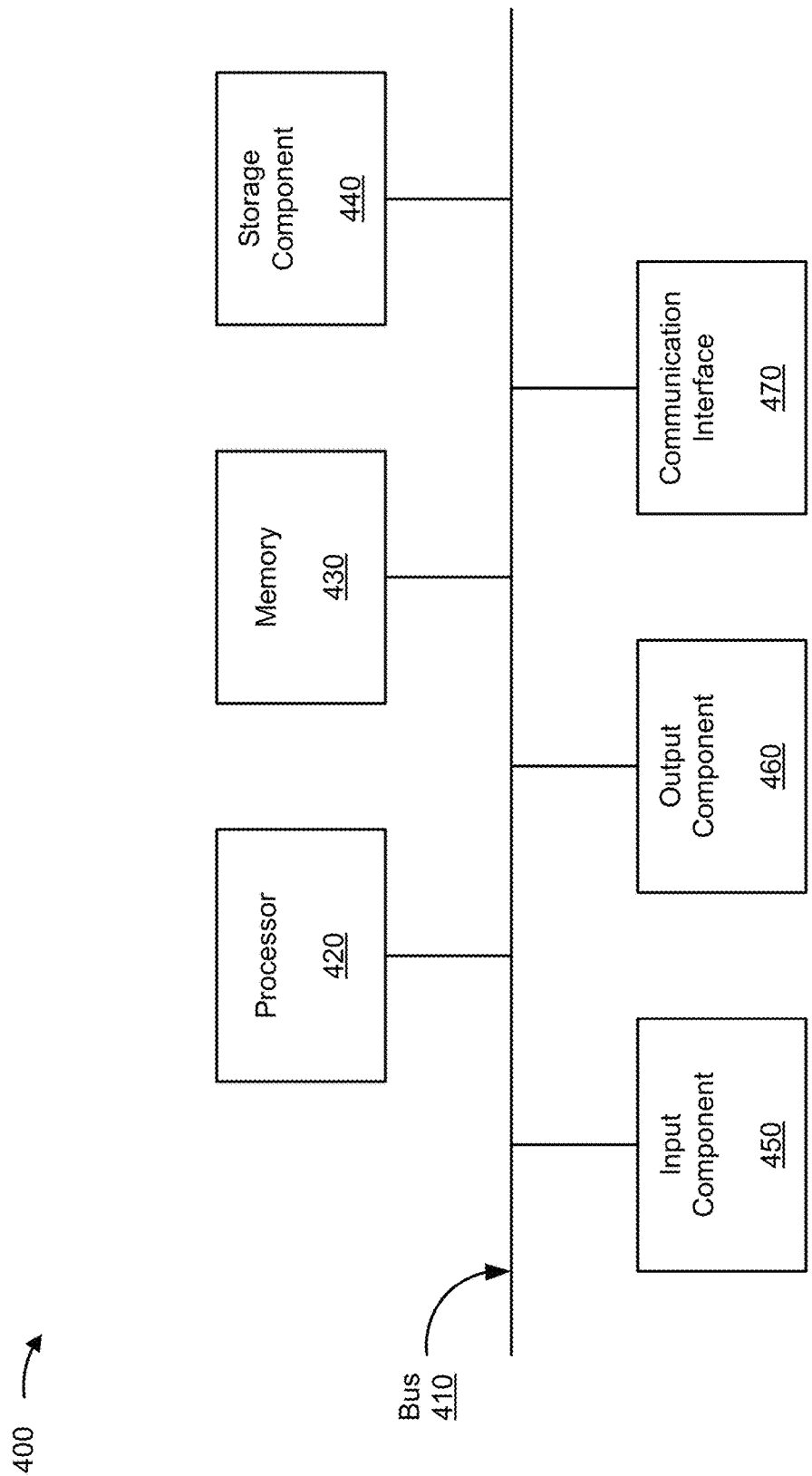
FIG. 4 is a diagram of example components of one or more devices of FIG. 3.

FIG. 4 is a diagram of example components of a device 400. Device 400 may correspond to user device 310, debt resolution planning platform 330, and/or computing resource 335 of debt resolution planning platform 330. In some implementations, user device 310, debt resolution planning platform 330, and/or computing resource 335 of debt resolution planning platform 330 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 may include a component that permits communication among the components of device 400. Processor 420 may be implemented in hardware, firmware, or a combination of hardware and software. Processor 420 may include a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 may include a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 may store information and/or software related to the operation and use of device 400. For example, storage component 440 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 450 may include a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 may include a component that provides output information from device 400 (e.g., a display, a speaker, and/or one or more light-emitting diodes (LEDs)).

Communication interface 470 may include a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
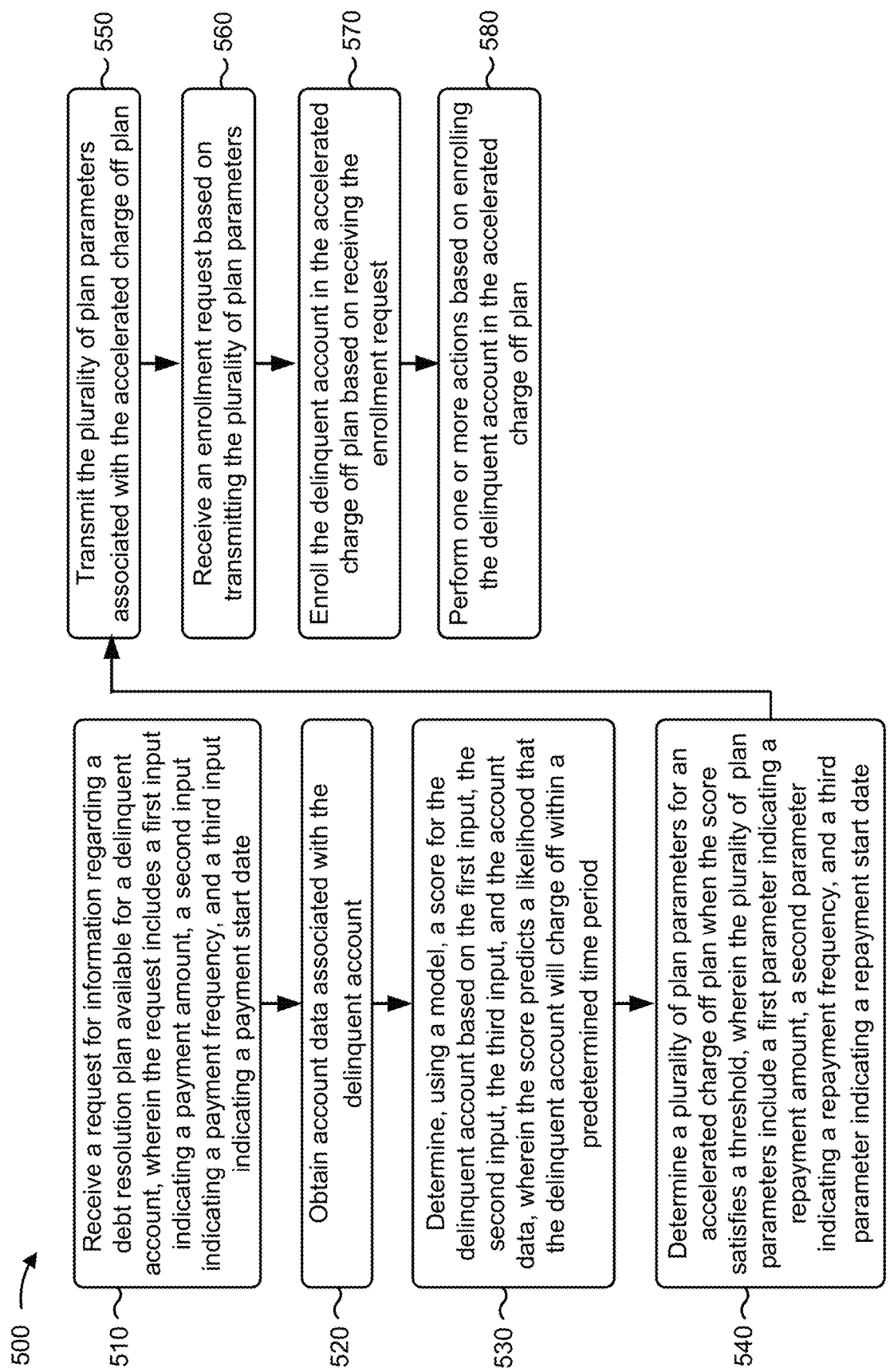
FIG. 5 is a flow chart of an example process for accelerating an account charge off.

FIG. 5 is a flow chart of an example process 500 for accelerating an account charge off. In some implementations, one or more process blocks of FIG. 5 may be performed by a debt resolution planning platform (e.g., debt resolution planning platform 330). In some implementations, one or more process blocks of FIG. 5 may be performed by another device or a group of devices separate from or including the debt resolution planning platform 330, such as user device 310. In some implementations, one or more process blocks of FIG. 5 may be performed by a cloud computing resource (e.g., computing resources 335) of cloud computing environment 320.

As shown in FIG. 5, process 500 may include receiving a request for information regarding a debt resolution plan available for a delinquent account, wherein the request includes a first input indicating a payment amount, a second input indicating a payment frequency, and a third input indicating a payment start date (block 510). For example, the debt resolution planning platform (e.g., using memory 430, storage component 440, input component 450, communication interface 470, and/or the like) may receive a request for information regarding a debt resolution plan available for a delinquent account, as described above in FIGS. 1A-1D. In some implementations, the request includes a first input indicating a payment amount, a second input indicating a payment frequency, and a third input indicating a payment start date.

As further shown in FIG. 5, process 500 may include obtaining account data associated with the delinquent account (block 520). For example, the debt resolution planning platform (e.g., using memory 430, storage component 440, input component 450, communication interface 470, and/or the like) may obtain account data associated with the delinquent account, as described above in FIGS. 1A-1D.

As further shown in FIG. 5, process 500 may include determining, using a model, a score for the delinquent account based on the first input, the second input, the third input, and the account data, wherein the score predicts a likelihood that the delinquent account will charge off within a predetermined time period (block 530). For example, the debt resolution planning platform (e.g., using processor 420, memory 430, storage component 440, communication interface 470, and/or the like) may determine a score for the delinquent account based on the first input, the second input, the third input, and the account data, as described above in FIGS. 1A-1D. In some implementations, the score predicts a likelihood that the delinquent account will charge off within a predetermined time period.

As further shown in FIG. 5, process 500 may include determining a plurality of plan parameters for an accelerated charge off plan when the score satisfies a threshold, wherein the plurality of plan parameters includes at least a first parameter indicating a repayment amount, a second parameter indicating a repayment frequency, and a third parameter indicating a repayment start date (block 540). For example, debt resolution planning platform (e.g., using processor 420, memory 430, storage component 440, communication interface 470, and/or the like) may determine a plurality of plan parameters for an accelerated charge off plan when the score satisfies a threshold, as described above in FIGS. 1A-1D. In some implementations, the plurality of plan parameters includes at least a first parameter indicating a repayment amount, a second parameter indicating a repayment frequency, and a third parameter indicating a repayment start date.

As further shown in FIG. 5, process 500 may include transmitting the plurality of plan parameters associated with the accelerated charge off plan (block 550). For example, debt resolution planning platform (e.g., using storage component 440, output component 460, communication interface 470, and/or the like) may transmit the plurality of plan parameters associated with the accelerated charge off plan, as described above in FIGS. 1A-1D.

As further shown in FIG. 5, process 500 may include receiving an enrollment request based on transmitting the plurality of plan parameters (block 560). For example, debt resolution planning platform (e.g., using storage component 440, input component 450, communication interface 470, and/or the like) may receive an enrollment request based on transmitting the plurality of plan parameters, as described above in FIGS. 1A-1D.

As further shown in FIG. 5, process 500 may include enrolling the delinquent account in the accelerated charge off plan based on receiving the enrollment request (block 570). For example, debt resolution planning platform (e.g., using processor 420, memory 430, storage component 440, communication interface 470, and/or the like) may enroll the delinquent account in the accelerated charge off plan based on receiving the enrollment request, as described above in FIGS. 1A-1D.

As further shown in FIG. 5, process 500 may include performing one or more actions based on enrolling the delinquent account in the accelerated charge off plan (block 580). For example, debt resolution planning platform (e.g., using processor 420, memory 430, storage component 440, input component 450, output component 460, communication interface 470, and/or the like) may perform one or more actions based on enrolling delinquent account in the accelerated charge off plan, as described above in FIGS. 1A-1D.

Process 500 may include additional implementations, such as any single implementation or any combination of implementations described below and/or in connection with one or more other processes described elsewhere herein.

In some implementations, process 500 may include reporting the delinquent account as being charged off to a credit entity, revoking charging privileges for the delinquent account, moving the delinquent account to a charge off system of record, suspending or reducing late fees for the delinquent account, suspending or reducing interest for the delinquent account, reducing a minimum payment for the delinquent account, and/or suspending collection communications for the delinquent account. In some implementations, process 500 may include suspending collection communications, including communications delivered by way of electronic mail, telephone, and/or a postal service.

In some implementations, process 500 may include monitoring activity associated with the accelerated charge off plan, detecting completion of the accelerated charge off plan, and notifying a credit entity that the delinquent account is paid in full based on detecting completion of the accelerated charge off plan. In some implementations, process 500 may include monitoring activity associated with the accelerated charge off plan, determining noncompliance with the accelerated charge off plan, and terminating the accelerated charge off plan.

In some implementations, process 500 may include obtaining account data that includes a current interest rate for the delinquent account, a current amount of fees associated with the delinquent account, or a current minimum payment associated with the delinquent account. In some implementations, process 500 may include generating and sending an enrollment communication to a user. In some implementations, process 500 may include determining a score that predicts a likelihood that the account will charge off within 36 months.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
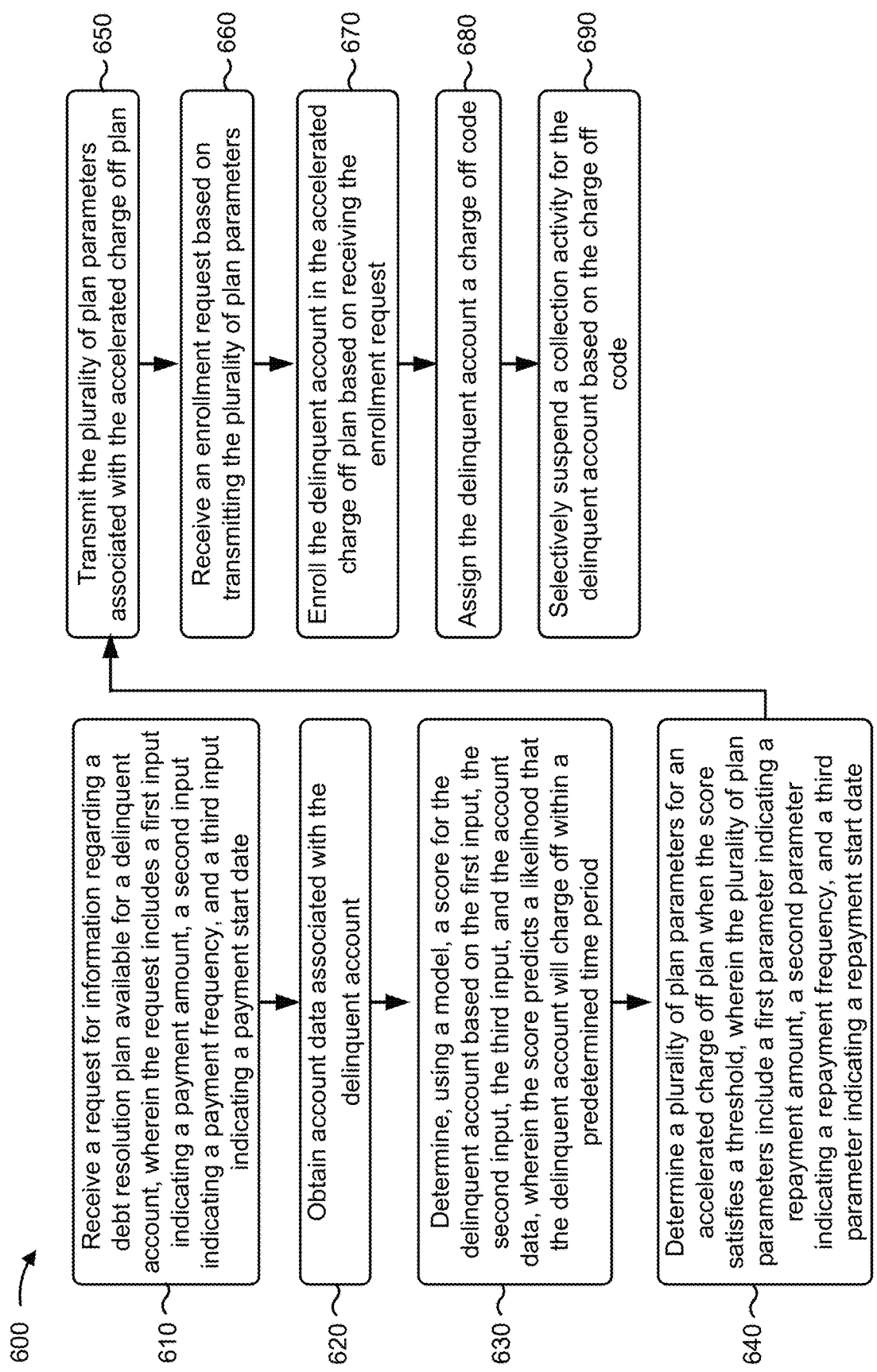
FIG. 6 is a flow chart of an example process for accelerating an account charge off

FIG. 6 is a flow chart of an example process 600 for accelerating an account charge off. In some implementations, one or more process blocks of FIG. 6 may be performed by a debt resolution planning platform (e.g., debt resolution planning platform 330). In some implementations, one or more process blocks of FIG. 6 may be performed by another device or a group of devices separate from or including the debt resolution planning platform 330, such as user device 310. In some implementations, one or more process blocks of FIG. 6 may be performed by a cloud computing resource (e.g., computing resources 335) of cloud computing environment 320.

As shown in FIG. 6, process 600 may include receiving a request for information regarding a debt resolution plan available for a delinquent account, wherein the request includes a first input indicating a payment amount, a second input indicating a payment frequency, and a third input indicating a payment start date (block 610). For example, the debt resolution planning platform (e.g., using memory 430, storage component 440, input component 450, communication interface 470, and/or the like) may receive a request for information regarding a debt resolution plan available for a delinquent account, as described above in FIGS. 1A-1D. In some implementations, the request includes a first input indicating a payment amount, a second input indicating a payment frequency, and a third input indicating a payment start date.

As further shown in FIG. 6, process 600 may include obtaining account data associated with the delinquent account (block 620). For example, the debt resolution planning platform (e.g., using memory 430, storage component 440, input component 450, communication interface 470, and/or the like) may obtain account data associated with the delinquent account, as described above in FIGS. 1A-1D.

As further shown in FIG. 6, process 600 may include determining, using a model, a score for the delinquent account based on the first input, the second input, the third input, and the account data, wherein the score predicts a likelihood that the delinquent account will charge off within a predetermined time period (block 630). For example, the debt resolution planning platform (e.g., using processor 420, memory 430, storage component 440, communication interface 470, and/or the like) may determine a score for the delinquent account based on the first input, the second input, the third input, and the account data, as described above in FIGS. 1A-1D. In some implementations, the score predicts a likelihood that the delinquent account will charge off within a predetermined time period.

As further shown in FIG. 6, process 600 may include determining a plurality of plan parameters for an accelerated charge off plan when the score satisfies a threshold, wherein the plurality of plan parameters includes at least a first parameter indicating a repayment amount, a second parameter indicating a repayment frequency, and a third parameter indicating a repayment start date (block 640). For example, debt resolution planning platform (e.g., using processor 420, memory 430, storage component 440, communication interface 470, and/or the like) may determine a plurality of plan parameters for an accelerated charge off plan when the score satisfies a threshold, as described above in FIGS. 1A-1D. In some implementations, the plurality of plan parameters includes at least a first parameter indicating a repayment amount, a second parameter indicating a repayment frequency, and a third parameter indicating a repayment start date.

As further shown in FIG. 6, process 600 may include transmitting the plurality of plan parameters associated with the accelerated charge off plan (block 650). For example, debt resolution planning platform (e.g., using storage component 440, output component 460, communication interface 470, and/or the like) may transmit the plurality of plan parameters associated with the accelerated charge off plan, as described above in FIGS. 1A-1D.

As further shown in FIG. 6, process 600 may include receiving an enrollment request based on transmitting the plurality of plan parameters (block 660). For example, debt resolution planning platform (e.g., using storage component 440, input component 450, communication interface 470, and/or the like) may receive an enrollment request based on transmitting the plurality of plan parameters, as described above in FIGS. 1A-1D.

As further shown in FIG. 6, process 600 may include enrolling the delinquent account in the accelerated charge off plan based on receiving the enrollment request (block 670). For example, debt resolution planning platform (e.g., using processor 420, memory 430, storage component 440, communication interface 470, and/or the like) may enroll the delinquent account in the accelerated charge off plan based on receiving the enrollment request, as described above in FIGS. 1A-1D.

As further shown in FIG. 6, process 600 may include assigning the delinquent account a charge off code (block 680). For example, debt resolution planning platform (e.g., using processor 420, memory 430, storage component 440, input component 450, output component 460, communication interface 470, and/or the like) may assign the delinquent account a charge off code, as described above in FIGS. 1A-1D.

As further shown in FIG. 6, process 600 may include selectively suspending a collection activity for the delinquent account based on the charge off code (block 690). For example, debt resolution planning platform (e.g., using processor 420, memory 430, storage component 440, input component 450, output component 460, communication interface 470, and/or the like) may selectively suspend a collection activity for the delinquent account based on the charge off code, as described above in FIGS. 1A-1D.

Process 600 may include additional implementations, such as any single implementation or any combination of implementations described below and/or in connection with one or more other processes described elsewhere herein.

In some implementations, process 600 may include selectively suspending a collection activity that includes assigning a late fee to the delinquent account, assigning an interest amount to the delinquent account, and/or communicating a collection notice to a user associated with the delinquent account.

In some implementations, process 600 may include monitoring activity associated with the accelerated charge off plan, detecting completion of the accelerated charge off plan, and notifying a credit entity that the delinquent account is paid in full based on detecting completion of the accelerated charge off plan. In some implementations, process 600 may include monitoring activity associated with the accelerated charge off plan, determining noncompliance with the accelerated charge off plan, and terminating the accelerated charge off plan.

In some implementations, process 600 may include reporting the delinquent account as being charged off to a credit entity. In some implementations, process 600 may include generating and sending an enrollment communication to a user. In some implementations, process 600 may include receiving the request for information from a computing device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 for accelerating an account charge off. In some implementations, one or more process blocks of FIG. 7 may be performed by a debt resolution planning platform (e.g., debt resolution planning platform 330). In some implementations, one or more process blocks of FIG. 7 may be performed by another device or a group of devices separate from or including the debt resolution planning platform 330, such as user device 310. In some implementations, one or more process blocks of FIG. 7 may be performed by a cloud computing resource (e.g., computing resources 335) of cloud computing environment 320.

As shown in FIG. 7, process 700 may include receiving a request for information regarding a debt resolution plan available for a delinquent account, wherein the request includes a first input indicating a payment amount, a second input indicating a payment frequency, and a third input indicating a payment start date (block 710). For example, the debt resolution planning platform (e.g., using memory 430, storage component 440, input component 450, communication interface 470, and/or the like) may receive a request for information regarding a debt resolution plan available for a delinquent account, as described above in FIGS. 1A-1D. In some implementations, the request includes a first input indicating a payment amount, a second input indicating a payment frequency, and a third input indicating a payment start date.

As further shown in FIG. 7, process 700 may include obtaining account data associated with the delinquent account (block 720). For example, the debt resolution planning platform (e.g., using memory 430, storage component 440, input component 450, communication interface 470, and/or the like) may obtain account data associated with the delinquent account, as described above in FIGS. 1A-1D.

As further shown in FIG. 7, process 700 may include determining, using a model, a score for the delinquent account based on the first input, the second input, the third input, and the account data, wherein the score predicts a likelihood that the delinquent account will charge off within a predetermined time period (block 730). For example, the debt resolution planning platform (e.g., using processor 420, memory 430, storage component 440, communication interface 470, and/or the like) may determine a score for the delinquent account based on the first input, the second input, the third input, and the account data, as described above in FIGS. 1A-1D. In some implementations, the score predicts a likelihood that the delinquent account will charge off within a predetermined time period.

As further shown in FIG. 7, process 700 may include determining a plurality of plan parameters for an accelerated charge off plan when the score satisfies a threshold, wherein the plurality of plan parameters includes at least a first parameter indicating a repayment amount, a second parameter indicating a repayment frequency, and a third parameter indicating a repayment start date (block 740). For example, debt resolution planning platform (e.g., using processor 420, memory 430, storage component 440, communication interface 470, and/or the like) may determine a plurality of plan parameters for an accelerated charge off plan when the score satisfies a threshold, as described above in FIGS. 1A-1D. In some implementations, the plurality of plan parameters includes at least a first parameter indicating a repayment amount, a second parameter indicating a repayment frequency, and a third parameter indicating a repayment start date.

As further shown in FIG. 7, process 700 may include transmitting the plurality of plan parameters associated with the accelerated charge off plan (block 750). For example, debt resolution planning platform (e.g., using storage component 440, output component 460, communication interface 470, and/or the like) may transmit the plurality of plan parameters associated with the accelerated charge off plan, as described above in FIGS. 1A-1D.

As further shown in FIG. 7, process 700 may include receiving an enrollment request based on transmitting the plurality of plan parameters (block 760). For example, debt resolution planning platform (e.g., using storage component 440, input component 450, communication interface 470, and/or the like) may receive an enrollment request based on transmitting the plurality of plan parameters, as described above in FIGS. 1A-1D.

As further shown in FIG. 7, process 700 may include enrolling the delinquent account in the accelerated charge off plan based on receiving the enrollment request (block 770). For example, debt resolution planning platform (e.g., using processor 420, memory 430, storage component 440, communication interface 470, and/or the like) may enroll the delinquent account in the accelerated charge off plan based on receiving the enrollment request, as described above in FIGS. 1A-1D.

As further shown in FIG. 7, process 700 may include suspending at least one collection activity associated with the delinquent account based on enrolling the delinquent account in the accelerated charge off plan, wherein the at least one collection activity includes assigning a late fee to the delinquent account, assigning an interest amount to the delinquent account, and/or communicating a collection notice to a user associated with the delinquent account (block 780). For example, debt resolution planning platform (e.g., using processor 420, memory 430, storage component 440, input component 450, output component 460, communication interface 470, and/or the like) may suspend at least one collection activity associated with the delinquent account based on enrolling the delinquent account in the accelerated charge off plan, as described above in FIGS. 1A-1D. In some implementations, the collection activity includes assigning a late fee to the delinquent account, assigning an interest amount to the delinquent account, and/or communicating a collection notice to a user associated with the delinquent account.

Process 700 may include additional implementations, such as any single implementation or any combination of implementations described below and/or in connection with one or more other processes described elsewhere herein.

In some implementations, process 700 may include monitoring activity associated with the accelerated charge off plan, detecting completion of the accelerated charge off plan, and notifying a credit entity that the delinquent account is paid in full based on detecting completion of the accelerated charge off plan. In some implementations, process 700 may include monitoring activity associated with the accelerated charge off plan, determining noncompliance with the accelerated charge off plan; and terminating the accelerated charge off plan.

In some implementations, process 700 may include reporting the delinquent account as being charged off to a credit entity. In some implementations, process 700 may include determining a score that predicts a likelihood that the account will charge off within 36 months.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that the devices, systems, and/or methods, described herein, may be implemented in different forms of hardware, firmware, or a combination of hardware and software. The actual specialized control hardware or software code used to implement these devices, systems, and/or methods is not limiting of the implementations. Thus, the operation and behavior of the devices, systems, and/or methods were described herein without reference to specific software code—it being understood that software and hardware can be designed to implement the devices, systems, and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   obtaining, by a device and from a data structure in communication with the device, historical data associated with historical user account information for a plurality of historical accounts and historical user inputs for a plurality of users associated with the plurality of historical accounts;
   partitioning, by the device, the historical data into a training set, a validation set, and a test set;
   performing, by the device, dimensionality reduction on the training set, reducing the training set to a minimum feature set;
   training, by the device, a machine learning model, using the validation set and a naïve Bayesian classifier technique to:
      perform binary recursive partitioning to split data included in the minimum feature set into partitions, and
      perform charge off predictions associated with the test set,
         the machine learning model being trained to receive, as input, first plan parameters and historical user account data, and
         the machine learning model being trained to generate a predictive charge off score based on the first plan parameters and the historical user account data;
   receiving, by the device, a request for information regarding a debt resolution plan available for a delinquent account,
      wherein the request includes inputs that correspond to the first plan parameters, the inputs comprising:
         a first input indicating a payment amount,
         a second input indicating a payment frequency, and
         a third input indicating a payment start date;
   obtaining, by the device, account data associated with the delinquent account;
   determining, by the device and using the machine learning model, the predictive charge off score for the delinquent account based on providing the machine learning model with the first input, the second input, the third input, and the account data,
      wherein the predictive charge off score predicts a likelihood that a creditor associated with the delinquent account will charge off the delinquent account within a predetermined time period;
   determining, by the device, second plan parameters for an accelerated charge off plan when the predictive charge off score satisfies a threshold,
   the accelerated charge off plan specifying a charge off time, prior to an end of the predetermined time period, at which the delinquent account will be proactively charged off, and
   wherein the second plan parameters include:
      a first parameter indicating a repayment amount,
      a second parameter indicating a repayment frequency, and
      a third parameter indicating a repayment start date;
   transmitting, by the device and to a user device associated with the delinquent account, the second plan parameters;
   receiving, by the device and from the user device, an enrollment request based on transmitting the second plan parameters;
   enrolling, by the device, the delinquent account in the accelerated charge off plan based on receiving the enrollment request; and
   performing, by the device, one or more actions based on enrolling the delinquent account in the accelerated charge off plan.

2. The method of claim 1, wherein the one or more actions include at least one of:
   reporting the delinquent account as being charged off to a credit entity,
   revoking charging privileges for the delinquent account,
   moving the delinquent account to a charge off system of record,
   suspending or reducing late fees for the delinquent account,
   suspending or reducing interest for the delinquent account,
   reducing a minimum payment for the delinquent account, or
   suspending collection communications for the delinquent account.

3. The method of claim 2, wherein the collection communications include communications delivered by way of at least one of electronic mail, telephone, or a postal service.

4. The method of claim 1, further comprising:
   monitoring activity associated with the accelerated charge off plan;
   detecting completion of the accelerated charge off plan; and
   notifying a credit entity that the delinquent account is paid in full based on detecting completion of the accelerated charge off plan.

5. The method of claim 1, further comprising:
   monitoring activity associated with the accelerated charge off plan;
   determining noncompliance with the accelerated charge off plan; and
   terminating the accelerated charge off plan.

6. The method of claim 1, wherein the account data includes:
a current interest rate for the delinquent account,
a current amount of fees associated with the delinquent account, or
a current minimum payment associated with the delinquent account.

7. The method of claim 1, further comprising:
generating and sending an enrollment communication to a user.

8. The method of claim 1, wherein the predetermined time period is less than 36 months.

9. A device, comprising:
one or more memories; and
one or more processors, communicatively coupled to the one or more memories, to:
obtain, from a data structure in communication with the device, historical data associated with historical user account information for a plurality of historical accounts and historical user inputs for a plurality of users associated with the plurality of historical accounts;
partition the historical data into a training set, a validation set, and a test set;
perform dimensionality reduction on the training set, reducing to reduce the training set to a minimum feature set;
train a machine learning model, using the validation set and a nave Bayesian classifier technique to:
perform binary recursive partitioning to split data included in the minimum feature set into partitions, and
perform charge off predictions associated with the test set,
the machine learning model being trained to receive, as input, first plan parameters and historical user account data, and
the machine learning model being trained to generate a predictive charge off score based on the first plan parameters and the historical user account data;
receive a request for information regarding a debt resolution plan available for a delinquent account,
wherein the request includes inputs that correspond to the first plan parameters, the inputs comprising:
a first input indicating a payment amount,
a second input indicating a payment frequency, and
a third input indicating a payment start date;
obtain account data associated with the delinquent account;
determine, using the machine learning model, the predictive charge off score for the delinquent account based on providing the machine learning model with the first input, the second input, the third input, and the account data,
wherein the predictive charge off score predicts a likelihood that a creditor associated with the delinquent account will charge off the delinquent account within a predetermined time period;
determine second plan parameters for an accelerated charge off plan when the predictive charge off score satisfies a threshold,
the accelerated charge off plan specifying a charge off time, prior to an end of the predetermined time period, at which the delinquent account will be proactively charged off, and
wherein the second plan parameters include:
a first parameter indicating a repayment amount,
a second parameter indicating a repayment frequency, and
a third parameter indicating a repayment start date;
transmit, to a user device associated with the delinquent account, the second plan parameters;
receive, from the user device, an enrollment request based on transmitting the second plan parameters;
enroll the delinquent account in the accelerated charge off plan based on receiving the enrollment request;
assign the delinquent account a charge off code; and
selectively suspend a collection activity for the delinquent account based on the charge off code.

10. The device of claim 9, wherein the collection activity includes at least one of:
assigning a late fee to the delinquent account,
assigning an interest amount to the delinquent account, or
communicating a collection notice to a user associated with the delinquent account.

11. The device of claim 9, wherein the one or more processors are further to:
monitor activity associated with the accelerated charge off plan;
detect completion of the accelerated charge off plan; and
notify a credit entity that the delinquent account is paid in full based on detecting completion of the accelerated charge off plan.

12. The device of claim 9, wherein the one or more processors are further to:
monitor activity associated with the accelerated charge off plan;
determine noncompliance with the accelerated charge off plan; and
terminate the accelerated charge off plan.

13. The device of claim 9, wherein the one or more processors are further to:
report the delinquent account as being charged off to a credit entity.

14. The device of claim 9, wherein the one or more processors are further to:
generate and send an enrollment communication to a user.

15. The device of claim 9, wherein the request is received from the user device.

16. A non-transitory computer-readable medium storing instructions, the instructions comprising:
one or more instructions that, when executed by one or more processors, cause the one or more processors to:
obtain, from a data structure in communication with the one or more processors, historical data associated with historical user account information for a plurality of historical accounts and historical user inputs for a plurality of users associated with the plurality of historical accounts;
partition the historical data into a training set, a validation set, and a test set;
perform dimensionality reduction on the training set, reducing to reduce the training set to a minimum feature set;
train a machine learning model, using the validation set and a naïve Bayesian classifier technique to:
perform binary recursive partitioning to split data included in the minimum feature set into partitions, and
perform charge off predictions associated with the test set, the machine learning model being trained to receive, as input, first plan parameters and historical user account data, and the machine learning model being trained to generate a predictive charge off score based on the first plan parameters and the historical user account data;

receive a request for information regarding a debt resolution plan available for a delinquent account, wherein the request includes inputs that correspond to the first plan parameters, the inputs comprising:

a first input indicating a payment amount,
a second input indicating a payment frequency, and
a third input indicating a payment start date;

obtain account data associated with the delinquent account;

determine, using the machine learning model, the predictive charge off score for the delinquent account based on providing the machine learning model with the first input, the second input, the third input, and the account data, wherein the predictive charge off score predicts a likelihood that a creditor associated with the delinquent account will charge off the delinquent account within a predetermined time period;

determine second plan parameters for an accelerated charge off plan when the predictive charge off score satisfies a threshold, the accelerated charge off plan specifying a charge off time, prior to an end of the predetermined time period, at which the delinquent account will be proactively charged off, and wherein the second plan parameters include:

a first parameter indicating a repayment amount,
a second parameter indicating a repayment frequency, and
a third parameter indicating a repayment start date;

transmit, to a user device associated with the delinquent account, the second plan parameters;

transmit, to a user device associated with the delinquent account, the second plan parameters;

receive, from the user device, an enrollment request based on transmitting the second plan parameters;

enroll the delinquent account in the accelerated charge off plan based on receiving the enrollment request;

suspend at least one collection activity associated with the delinquent account based on enrolling the delinquent account in the accelerated charge off plan, wherein the at least one collection activity includes at least one of:

assigning a late fee to the delinquent account,
assigning an interest amount to the delinquent account,
or communicating a collection notice to a user associated with the delinquent account.

17. The non-transitory computer-readable medium of claim 16, wherein the one or more instructions, when executed by the one or more processors, further cause the one or more processors to:

monitor activity associated with the accelerated charge off plan;
detect completion of the accelerated charge off plan; and
notify a credit entity that the delinquent account is paid in full based on detecting completion of the accelerated charge off plan.

18. The non-transitory computer-readable medium of claim 16, wherein the one or more instructions, when executed by the one or more processors, further cause the one or more processors to:

monitor activity associated with the accelerated charge off plan;
determine noncompliance with the accelerated charge off plan; and
terminate the accelerated charge off plan.

19. The non-transitory computer-readable medium of claim 16, wherein the one or more instructions, when executed by the one or more processors, further cause the one or more processors to:

report the delinquent account as being charged off to a credit entity.

20. The non-transitory computer-readable medium of claim 16, wherein the predetermined time period is less than 36 months.

* * * * *